(12) United States Patent
Lao et al.

(10) Patent No.: US 11,122,846 B2
(45) Date of Patent: Sep. 21, 2021

(54) BREATHABLE FABRICS WITH SMART PORES

(71) Applicant: Cornell University, Ithaca, NY (US)

(72) Inventors: Lihong Lao, Ithaca, NY (US); Jintu Fan, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 16/664,674

(22) Filed: Oct. 25, 2019

(65) Prior Publication Data

US 2020/0131695 A1 Apr. 30, 2020

Related U.S. Application Data

(60) Provisional application No. 62/750,706, filed on Oct. 25, 2018.

(51) Int. Cl.
*A41D 27/28* (2006.01)
*A41D 31/10* (2019.01)
(Continued)

(52) U.S. Cl.
CPC ........... *A41D 27/28* (2013.01); *A41D 1/00* (2013.01); *A41D 31/12* (2019.02); *B32B 3/266* (2013.01);
(Continued)

(58) Field of Classification Search
None
See application file for complete search history.

(56) References Cited

U.S. PATENT DOCUMENTS 3,265,529 A * 8/1966 Caldwell .............. D06N 3/04
442/76
3,890,974 A * 6/1975 Kozak ............... A61F 13/53713
604/368
(Continued)

FOREIGN PATENT DOCUMENTS

CN 1844553 A * 10/2006
CN 105661679 A * 6/2016
(Continued)

OTHER PUBLICATIONS

Machine Translation of CN-106418779-A, Feb. 2017 (Year: 2017).*
(Continued)

*Primary Examiner* — Jeffrey A Vonch
(74) *Attorney, Agent, or Firm* — Johnson, Marcou, Isaacs & Nix, LLC; Paul J. Roman, Jr., Esq.

(57) ABSTRACT

Described are moisture responsive materials. The materials may have tunable moisture permeability. A material may be a substrate that includes apertures. The apertures are configured to open or close depending on the humidity environment to which the substrate is exposed. The apertures have at least two regions of polymer gel, which may have different amounts of crosslinking. The apertures may be formed from at least two polymer gels having at least two different crosslinker loadings. The materials may be used in articles of manufacture. For example, the materials are used in wearable articles, outdoor articles, medical articles, packaging articles, building articles, filtration/separation articles, and the like.

25 Claims, 17 Drawing Sheets

(51) Int. Cl.
    *A41D 31/12*      (2019.01)
    *D06M 15/285*      (2006.01)
    *D06M 23/16*      (2006.01)
    *A41D 1/00*      (2018.01)
    *D06N 3/12*      (2006.01)
    *B32B 5/14*      (2006.01)
    *B32B 3/26*      (2006.01)
    *D06N 3/00*      (2006.01)
    *D06M 10/00*      (2006.01)
    *A41D 31/102*      (2019.01)
    *B32B 5/02*      (2006.01)
    *B32B 27/02*      (2006.01)
    *A47G 9/08*      (2006.01)

(52) U.S. Cl.
CPC .............. *B32B 5/142* (2013.01); *B32B 5/147* (2013.01); *D06M 23/16* (2013.01); *D06N 3/125* (2013.01); *A41D 31/102* (2019.02); *A41D 2500/10* (2013.01); *A41D 2500/20* (2013.01); *A41D 2500/30* (2013.01); *A41D 2500/50* (2013.01); *A47G 9/08* (2013.01); *B32B 5/022* (2013.01); *B32B 5/024* (2013.01); *B32B 5/026* (2013.01); *B32B 27/02* (2013.01); *B32B 2255/02* (2013.01); *B32B 2255/26* (2013.01); *B32B 2255/28* (2013.01); *B32B 2260/021* (2013.01); *B32B 2260/046* (2013.01); *B32B 2305/72* (2013.01); *B32B 2305/74* (2013.01); *B32B 2307/70* (2013.01); *B32B 2307/728* (2013.01); *B32B 2333/04* (2013.01); *B32B 2437/00* (2013.01); *D06M 10/001* (2013.01); *D06M 15/285* (2013.01); *D06N 3/0043* (2013.01); *D06N 2209/123* (2013.01); *D06N 2211/10* (2013.01); *D06N 2211/125* (2013.01); *D06N 2213/04* (2013.01); *Y10T 428/2481* (2015.01); *Y10T 428/24273* (2015.01); *Y10T 428/24298* (2015.01); *Y10T 428/24314* (2015.01); *Y10T 428/24322* (2015.01); *Y10T 428/24793* (2015.01); *Y10T 428/24802* (2015.01); *Y10T 428/24942* (2015.01); *Y10T 442/2484* (2015.04); *Y10T 442/30* (2015.04); *Y10T 442/40* (2015.04); *Y10T 442/60* (2015.04)

(56) References Cited

U.S. PATENT DOCUMENTS

| | | | | |
|---|---|---|---|---|
| 4,541,426 | A * | 9/1985 | Webster | A61L 15/58 602/47 |
| 5,672,406 | A * | 9/1997 | Challis | A61F 13/023 428/136 |
| 6,332,221 | B1 * | 12/2001 | Gracey | A41B 9/00 2/69 |
| 6,767,850 | B1 * | 7/2004 | Tebbe | D03D 15/00 442/76 |
| 6,770,579 | B1 * | 8/2004 | Dawson | A41D 31/145 442/181 |
| 2003/0010486 | A1 * | 1/2003 | Serra | B32B 25/045 165/185 |
| 2003/0161995 | A1 * | 8/2003 | Kauschke | B32B 5/22 428/138 |
| 2004/0241214 | A1 * | 12/2004 | Kirkwood | A61F 13/0263 424/445 |
| 2005/0204448 | A1 * | 9/2005 | Wise | D03D 9/00 2/69 |
| 2005/0204449 | A1 * | 9/2005 | Baron | A41D 13/0015 2/69 |
| 2005/0246813 | A1 * | 11/2005 | Davis | A41D 13/0056 2/69 |
| 2006/0179539 | A1 * | 8/2006 | Harber | A41D 13/002 2/69 |
| 2006/0270293 | A1 * | 11/2006 | Yasui | D02G 3/444 442/181 |
| 2007/0161305 | A1 * | 7/2007 | Wangbunyen | D06M 15/00 442/59 |
| 2007/0184238 | A1 * | 8/2007 | Hockaday | B32B 7/02 428/98 |
| 2008/0057809 | A1 * | 3/2008 | Rock | D06M 15/643 442/64 |
| 2008/0075850 | A1 * | 3/2008 | Rock | D06M 15/564 427/176 |
| 2008/0132133 | A1 * | 6/2008 | Yasui | D03D 15/47 442/200 |
| 2008/0254263 | A1 * | 10/2008 | Yasui | A41D 31/125 428/172 |
| 2008/0268735 | A1 * | 10/2008 | Kuroda | D04B 1/16 442/301 |
| 2009/0176052 | A1 * | 7/2009 | Childs | B01J 20/3272 428/101 |
| 2009/0176054 | A1 * | 7/2009 | Laib | D04H 1/00 428/137 |
| 2009/0276936 | A1 * | 11/2009 | Makida | D06N 3/14 2/69 |
| 2010/0242151 | A1 * | 9/2010 | Mather | A41D 27/28 2/115 |
| 2011/0092121 | A1 * | 4/2011 | Kapsali | D03D 15/567 442/181 |
| 2011/0099680 | A1 * | 5/2011 | Gordon | A41D 13/0015 2/79 |
| 2011/0104972 | A1 * | 5/2011 | Liu | C08L 51/08 442/221 |
| 2012/0032559 | A1 * | 2/2012 | Hino | H01L 41/047 310/331 |
| 2012/0142266 | A1 * | 6/2012 | Niwa | F24F 11/0008 454/339 |
| 2013/0109773 | A1 * | 5/2013 | Hebbrecht | D06M 23/04 521/134 |
| 2013/0133353 | A1 * | 5/2013 | Araujo | B29C 69/00 62/331 |
| 2014/0000004 | A1 * | 1/2014 | Baron | D04B 21/207 2/69 |
| 2014/0053312 | A1 * | 2/2014 | Nordstrom | A41D 1/00 2/69 |
| 2014/0069624 | A1 * | 3/2014 | Blackwell | D21H 13/24 165/185 |
| 2014/0182050 | A1 * | 7/2014 | Ameil | A62D 5/00 2/457 |
| 2015/0245949 | A1 * | 9/2015 | Locke | A61F 13/0283 604/319 |
| 2016/0010274 | A1 * | 1/2016 | Jarre | D06M 13/2243 428/138 |
| 2016/0339594 | A1 * | 11/2016 | Aihara | A41D 31/00 |
| 2016/0340814 | A1 * | 11/2016 | Ridley | B32B 5/12 |
| 2016/0340826 | A1 * | 11/2016 | Tibbits | D06M 15/227 |
| 2017/0273377 | A1 * | 9/2017 | Aihara | A41D 31/14 |
| 2017/0340037 | A1 * | 11/2017 | Bailey | A41D 13/0015 |
| 2019/0061307 | A1 * | 2/2019 | Chen | B32B 27/322 |
| 2019/0297975 | A1 * | 10/2019 | Aleksov | A61M 5/145 |
| 2019/0337260 | A1 * | 11/2019 | Huang | B32B 5/022 |
| 2019/0365000 | A1 * | 12/2019 | Simmons | A41D 27/28 |

FOREIGN PATENT DOCUMENTS

| | | | | |
|---|---|---|---|---|
| CN | 106418779 | A * | 2/2017 | |
| DE | 19619858 | A1 * | 11/1997 | ............. A41D 31/04 |
| EP | 0122085 | A1 | 10/1984 | |
| EP | 0875222 | A1 | 11/1998 | |
| GB | 2377939 | A * | 1/2003 | ............. B32B 5/18 |
| GB | 2379392 | B | 11/2004 | |
| JP | 05272061 | A * | 10/1993 | |
| JP | 06220775 | A * | 8/1994 | |
| JP | 2000218709 | A * | 8/2000 | |
| JP | 2001239623 | A * | 9/2001 | |
| JP | 2005023431 | A * | 1/2005 | |
| JP | 2007182651 | A * | 7/2007 | |

(56) References Cited

FOREIGN PATENT DOCUMENTS

| JP | 2008111214 A | * | 5/2008 | |
|---|---|---|---|---|
| JP | 2008303498 A | * | 12/2008 | |
| KR | 20110088280 A | * | 8/2011 | |
| KR | 20110088282 A | * | 8/2011 | |
| WO | 2003/011352 A1 | | 2/2003 | |
| WO | WO-2006062061 A1 | * | 6/2006 | D04B 1/14 |

OTHER PUBLICATIONS

Omidian et al., Swelling and Crosslink Density Measurements for Hydrogels, 1994, Iranian Journal of Polymer Science and Technology, vol. 3, No. 2 (Year: 1994).*

Okay, General Properties of Hydrogels, Aug. 2009, Hydrogel Sensors and Actuators, p. 1-14 (Year: 2008).*

Ahn et al., Stimuli-responsive polymer gels, Mar. 2008, Soft Matter, vol. 4, pp. 1151-1157 (Year: 2008).*

Cates, Influence of Crosslink Density on Swelling and Conformation of Surface-Constrained Poly(N-Isopropylacrylamide), Mar. 2010, Graduate Theses and Dissertations, University of South Florida (Year: 2010).*

Broudy, The First Cooling Shirt That Lowers Body Temperature, Aug. 2012, Popular Science, <https://www.popsci.com/technology/article/2012-07/first-shirt-lower-body-temperature/> (Year: 2012).*

Jocic, Polymer-Based Smart Coatings for Comfort in Clothing, 2016, Tekstilec, vol. 59, Issue 2, pp. 107-114 (Year: 2016).*

Gargava et al., Smart Hydrogel-Based Valves Inspired by the Stomata in Plants, Jul. 2016, ACS Applied Materials & Interfaces, vol. 8, Issues 28, pp. 18430-18438 (Year: 2016).*

Zhong et al., Reversible Humidity Sensitive Clothing for Personal Thermoregulation, Mar. 2017, Scientific Reports, vol. 7, Article No. 44208 (Year: 2017).*

Chu, Researchers design moisture-responsive workout suit, May 2017, MIT News, <https://news.mit.edu/2017/moisture-responsive-workout-suit-0519> (Year: 2017).*

Chao, L., et al., Humidity-responsive actuation of programmable hydrogel microstructures based on 3D printing, Sensors and Actuators B: Chemical, Dec. 15, 2017, vol. 259, pp. 736-744.

Wang, W., Harnessing the hygroscopic and biofluorescent behaviors of genetically tractable microbial cells to design biohybrid wearables, Science Advances, May 19, 2017, vol. 3, pp. 1-8.

* cited by examiner

B

| Condition | Wet | | | | | Dry | | | | |
|---|---|---|---|---|---|---|---|---|---|---|
| | Outer layer | | | | | Outer layer | | | | |
| Inner layer | None (0) | AAm & PAAm (LCP) | AAm (LC) | AAm & PAAm (HCP) | AAm (HC) | None (0) | AAm & PAAm (LCP) | AAm (LC) | AAm & PAAm (HCP) | AAm (HC) |
| None (0) | - | + | + | - | - | - | - | - | - | - |
| AAm & PAAm (LCP) | - | ++ (red) | ++ (red) | + | + | - | + (red) | * (red) | + | + |
| AAm (LC) | - | ++ (red) | ++ (red) | + | + | - | + (red) | * (red) | + | + |
| AAm & PAAm (HCP) | - | - | - | - | - | - | - | - | - | - |
| AAm (HC) | - | - | - | - | - | - | - | - | - | - |

The symbols -, + and ++ represent pore close, slightly open, and largely open, respectively.
* represents the hydrogel combination used

Fig. 3 (cont.)

BREATHABLE FABRICS WITH SMART PORES

CROSS REFERENCE TO RELATED APPLICATIONS

This application claims priority to U.S. Provisional Application No. 62/750,706, filed on Oct. 25, 2018, the disclosure of which is hereby incorporated by reference.

BACKGROUND OF THE DISCLOSURE

Smart breathable fabrics or membranes have attracted more and more attention, especially in protective clothing as well as other applications such as medical care products, food packing, nutrient/drug release, and liquid separations. The concept is unique in that the fabric or membrane is able to respond according to the environmental stimuli, i.e., the system can regulate shape, moisture or liquid transport under the stimuli such as light, temperature, pressure, electricity, magnetite, chemicals, etc. Depending on the different stimuli types and applications, the constituent materials (e.g. fiber, yarn, fabric, finishing and coating) will require specific chemical or physical features that can achieve these functionalities.

A stomata is a pore or opening in the epidermis of plant leaves, through which carbon dioxide is received for photosynthesis and water vapor is transpired. A stomata has two guard cells, having thicker and inextensible inner walls as well as thinner and extensible outer walls. The stomata open and close in response to changing conditions, such as light intensity, humidity, and carbon dioxide concentration. Under a high light intensity and high humidity (wet), the two guard cells are swollen and bowed apart from one another, creating an open pore to draw water in; conversely, when the plant senses a water shortage, the cells are shortened, resulting in the closure of the pore to prevent the water loss. The size of stoma lengths typically range from 10 to 80 µm and the width ranges from a few microns to 50 µm.

In apparel industry, there is always a demand to have smart materials functioning like the leaf stomata, which are able to regulate the moisture/vapor evaporation or even liquid transport according to the body humidity, i.e. pores can automatically open under higher humidity (wet) and close under lower humidity (dry) without any other energy input. This will be particularly useful to maximize the barrier protection and thermal comfort for a wearer's changing physiological conditions.

Currently, most existing smart materials are based on the response to temperature, chemicals, light, electricity and magnetite. For example, Hu et al. constructed a dual-layer hydrogel composed of polyacrylamide (PAAm) and PAAm-Poly (N-isopropylacrylamide) (PNIPAAm) interpenetrating polymer network (IPN), and found a shape change ability of the system under an elevated temperature from 30° C. to 38° C., which was above the lower critical solution temperature (LCST) of PNIPAAm. Similarly, Topham et al. constructed a two-gel structure with polyacid and polybase PH-sensitive triblock copolymers, and observed the gel motion under different acidic and neutral/basic conditions. Kim et al. and Park et al. applied the concept of leaf stomata to fabricate membranes with thermo-responsive PNIPAAm hydrogels, and enable the constructed pore to open or close by swelling or shrinking of the materials under different temperatures. Gargava et al. also prepared a hydrogel-based valve with PAAm and poly (N,N-dimethylacrylamide) (PDMAA) to mimic the stomata, but the regulation of the middle pore was based on a stimulus of acetone solvent. Besides, Akzo Nobel markets a rubber membrane product under the name of Stomatex®, which is claimed to mimic the opening and closure of the leaf stomata according to user's different levels of physical activity. Stomatex® is a synthetic rubber membrane having a pattern of dome-shaped vapor chambers, each with a tiny pore in the center. Yet, unlike the moisture responsiveness of leaf stomata, it enlarges the pores by the flexing of the material caused by body motion and strictly speaking, it is not environment-responsive.

Only a few studies have been reported for the materials' sensitivity to the water or moisture for opening and closing the pores. Zhong et al. patterned a Nafion™ (perfluorosulfonic acid ionomer) film, a commercial thermo-moisture responsive polymer from Dupont, with the pre-cut flaps, and confirmed its ability to bend towards the lower humidity side and thereafter produce pores when humidity increases; the film can also quickly recover to the original status once the humidity decreases. Mu et al. further attached the Nafion™ film on an inert substrate of polyethylene glycol terephthalate (PET) film, and integrated into commercial sports shirt to facilitate the formation of two-dimensional or three-dimensional geometrical changes of the flaps in response to vapor stimuli and consequential skin temperature drop. Using the same dual-layer and flap concepts, Wang et al. formed a heterogeneous biohybrid film with a layer of special living cells attaching on another humidity-inert layer, and achieved reversible shape change in response to the environment humidity; the films were further embedded into garment design as ventilating flaps to modulate the ventilation of the body under different humidity levels. However, in all these designs, the flap substrates are less stretchable and the bending actuations are through-planes, which can adversely affect both the comfort (e.g., tactile comfort) of the clothing and appearance. On the contrary, Jia et al. recently reported a water fog and humidity-driven torsional and tensile actuation of twisted, coiled, piled silk yarn and weave textile, which was able to contract 70% when the relative humidity was changed from 20% to 80% due to the water absorption-induced loss of hydrogen bonds within the silk proteins and the associated structural transformation; though the actuation was in-plane transformation, it was generally towards one direction (e.g., shrink towards up-warp direction), that means ventilation is increased in the fiber shrunken and skin exposed (e.g., arm) region, but it might be blocked in the fiber stuck and skin covered (e.g., shoulder) region; as a result, the overall comfort level may not increase on the skin.

Based on the foregoing, there exists and ongoing and unmet need for humidity- or moisture-sensitive smart materials.

SUMMARY OF THE DISCLOSURE

In an aspect, the present disclosure provides substrates (e.g., films, fabrics, and the like. The substrates may be breathable substrates. The substrates may have a plurality of apertures, which may be referred to as slits, gaps, pores or smart pores, each aperture having size (e.g., at least one dimension), for example, of 0 to 5 mm; and a plurality of regions (e.g., layers) each comprising a polymer gel (which may be referred to as a polymer system or polymer gel). The polymer gel is crosslinked. A polymer gel may be a polymer hydrogel that is crosslinked (which may be referred to as a hydrogel). The apertures may be moisture sensitive apertures. In various examples, a substrate (e.g., a fabric, a porous fabric, a film, such as for example, a polymer film, and the like) comprises: optionally, a plurality of apertures (e.g., gaps) each having size (e.g., at least one dimension), for example, of 0 to 5 mm, including all 0.1 mm values and ranges therebetween; a plurality of first regions (e.g., first layers) each comprising a first polymer gel or polymer hydrogel (e.g., a first region of a polymer gel or polymer hydrogel); and a plurality of second regions (e.g., second layers) each comprising a second polymer gel or polymer hydrogel (e.g., a second region of a polymer gel or polymer hydrogel). A substrate may comprise a plurality of third regions (e.g., third layers), each region comprising a third polymer gel or polymer hydrogel (e.g., a third region of a polymer gel or polymer hydrogel). In an example, a second region (e.g., second layer) of second polymer hydrogel, which may be a crosslinked polyacrylamide gel or hydrogel, is more cross-linked (e.g., in the case where the polymer gel or hydrogel materials are the same) or less swellable and/or less expandable (e.g., in the case where the polymer gel or hydrogel materials are the same or different) than the first region (e.g., first layer) of first polymer gel or hydrogel, which may be a cross-linked polyacrylamide gel or hydrogel, and/or the third region (e.g., third layer) of third polymer gel or hydrogel, which may be a cross-linked polyacrylamide gel or hydrogel.

In an aspect, the present disclosure provides methods of making substrates. The substrates may be substrates of the present disclosure. In various examples, a substrate (e.g., a substrate of the present disclosure) is made by a method of the present disclosure. An example of a method of making a substrate comprises: forming a region of a first polymer gel or polymer hydrogel precursor, crosslinking the first polymer gel or polymer hydrogel precursor on at least a portion of a substrate, which may have a photoinitiator (e.g., benzophenone) disposed thereon; crosslinking the first polymer precursor; forming a region of a second polymer gel or polymer hydrogel precursor, crosslinking the second polymer gel or polymer hydrogel precursor on at least a portion of the substrate; crosslinking the second polymer precursor; optionally, forming a region of a third polymer gel or polymer hydrogel precursor, crosslinking the third polymer gel or polymer hydrogel precursor on at least a portion of the substrate; if a first hydrogel precursor is used, crosslinking the third polymer precursor; and, optionally, forming one or more apertures.

In an aspect, the present disclosure provides uses of substrates. In various examples, an article of manufacture comprises one or more substrate(s) of the present disclosure. The article of manufacture may be a breathable article of manufacture. An article of manufacture may be a wearable article. The wearable article may be a breathable, wearable article.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
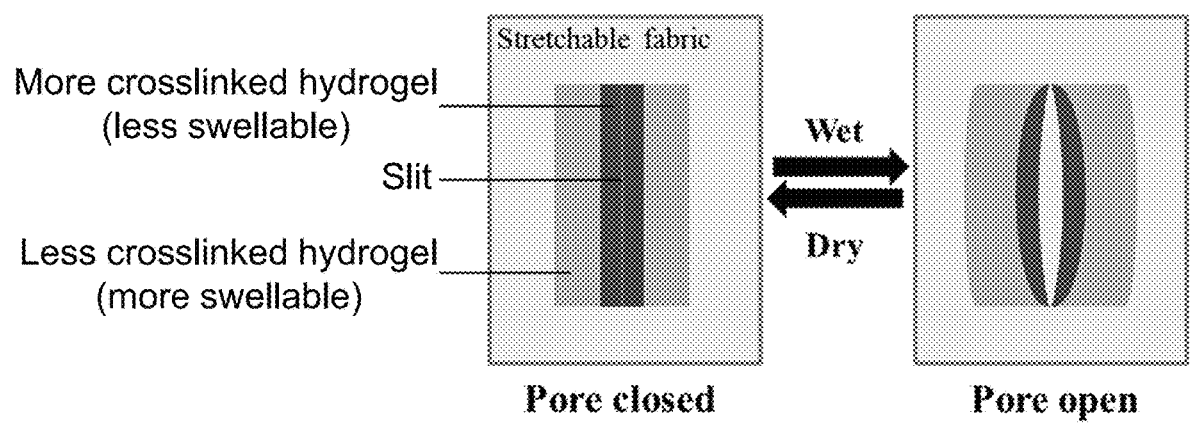
FIG. 1 shows a design scheme of stretchable fabrics with smart pores to mimic leaf stomata structure and function. Design of "artificial stomata" on a stretchable fabric with pore areas coated by a three-layer hydrogel system with a slit, where the inner layer was comprised of a more cross-linked (HC) less swellable hydrogel and outer layer composed of the less crosslinked (LC) more swellable hydrogel. The artificial stomata were hypothesized to open the pores under wet condition, and close the pores under dry condition.

Although claimed subject matter will be described in terms of certain embodiments and examples, other embodiments and examples, including embodiments and examples that do not provide all of the benefits and features set forth herein, are also within the scope of this disclosure. Various structural, logical, and process step changes may be made without departing from the scope of the disclosure.

Ranges of values are disclosed herein. The ranges set out a lower limit value and an upper limit value. Unless otherwise stated, the ranges include the lower limit value, the upper limit value, and all values between the lower limit value and the upper limit value, including, but not limited to, all values to the magnitude of the smallest value (either the lower limit value or the upper limit value).

The present disclosure provides substrates. The present disclosure also provides methods of making substrates and uses thereof.

The present disclosure describes substrates (e.g., breathable fabrics and films). The substrates comprise pores (which may be referred to as smart pores) that may mimic the structure and/or function of leaf stomata. In various examples of substrates of the present disclosure, a polymer system is coated around, for example, a slit ("pore" or "gap") of a fabric. The polymer(s) may bend asymmetrically toward one side under higher humidity (wet), leading the "pore" to open, while it stays still under lower (e.g., normal) humidity (dry) which keeps the "pore" closed. In both conditions, the substrate (e.g., fabric) maintains a flat surface without buckling, which has little effect on the overall dimension of the substrate.

In an aspect, the present disclosure provides substrates (e.g., films, fabrics, and the like). The substrates may be breathable substrates. The substrates may have a plurality of apertures, which may be referred to as slits, gaps, pores or smart pores, each aperture having size (e.g., at least one dimension), for example, of 0 to 5 mm; and a plurality of regions (e.g., layers) each comprising a polymer gel (which may be referred to as a polymer system or polymer gel). The polymer gel is crosslinked. A polymer gel may be a polymer hydrogel that is crosslinked (which may be referred to as a hydrogel). In various examples, a polymer gel or polymer hydrogel is not an interpenetrating polymer network and/or a pH sensitive and/or thermoresponsive polymer or copolymer. In an example, the polymer gel or polymer hydrogel regions are planar. The apertures may be moisture sensitive apertures. Non-limiting examples of substrates are described herein.

In various examples, a substrate (e.g., a fabric, a porous fabric, a film, such as for example, a polymer film, and the like) comprises: optionally, a plurality of apertures (e.g., gaps) each having size (e.g., at least one dimension), for example, of 0 to 5 mm, including all 0.1 mm values and ranges therebetween; a plurality of first regions (e.g., first layers) each comprising a first polymer gel or polymer hydrogel (e.g., a first region of a polymer gel or polymer hydrogel); and a plurality of second regions (e.g., second layers) each comprising a second polymer gel or polymer hydrogel (e.g., a second region of a polymer gel or polymer hydrogel). A substrate may also comprise a plurality of third regions (e.g., third layers), each region comprising a third polymer gel or polymer hydrogel (e.g., a third region of a polymer gel or polymer hydrogel).

Each of the plurality of first regions (e.g., first layers) of the polymer gel or polymer hydrogel may be disposed within and/or on at least a portion of the substrate, which is in proximity to (e.g., adjacent to) at least one of the apertures, if present, and/or disposed within and/or on at least a portion of a surface of the substrate, which may be adjacent to at least one of the plurality of apertures, if present. Each of the plurality of second regions (e.g., second layers) of the polymer gel or polymer hydrogel may be disposed within and/or on at least a portion of the substrate adjacent to at least one of the plurality of first regions (e.g., first layers) and/or disposed on at least a portion of (e.g., all of) a surface of the substrate in proximity to (e.g., adjacent to) at least one the plurality of first regions (e.g., first layers). A portion of a first region (e.g., first layer) and a portion of a second region (e.g., second layer) may overlap (e.g., overlap at a boundary of a region (e.g., a layer)). Each of the plurality of third regions (e.g., third layers) of the polymer gel or polymer hydrogel may be disposed within and/or on at least a portion of the substrate adjacent to at least one of the plurality of first regions (e.g., first layers) and/or disposed on at least a portion of (e.g., all of) a surface of the substrate in proximity to (e.g., adjacent to) at least one the plurality of first regions (e.g., first layers). A portion of a second region (e.g., second layer) and a portion of a third region (e.g., third layer) may or may not be adjacent or overlap (e.g., overlap at a boundary of a region (e.g., a layer)). A region may be completely within the substrate, may comprise a layer disposed on a surface of the substrate, or a combination thereof. By "in proximity to" it is meant that the distance between the first region and aperture and/or the second region and first region are such that the size of an aperture changes with a change in humidity or moisture. In various examples, a first region, a second region, and, if present, a third region (e.g., a first layer, a second layer, and, if present, a third layer) are arranged such that each is parallel with the substrate. The first layer(s), second layer(s), and, if present, the third layer(s) may be coplanar. In another example, the second region and third region (e.g., the second layer and third layer), if present, do not contact or overlap each other.

A second region may be arranged with respect to a first layer such that swelling and/or expansion of the second region causes the aperture to at least partially open along at least one dimension (e.g., at least one dimension of the aperture increases). A second region may completely surround the first layer or surround at least a portion of an exterior boundary of the aperture.

In the case where the second region does not completely surround the first layer, a third region may be in proximity (e.g., adjacent) to the first region. In an example, the second region and third region do not contact or overlap each other. In an example, the second region and third region are on opposite sides of first layer. In a more particular example, the first layer has a longest axis, the second region is disposed along a first side of the first layer that is parallel to the axis, and the third region is disposed along a second side of the first layer that is parallel to the axis and opposite the first side.

A first region (e.g., first layer) and second region (e.g., second layer) and, optionally, a third region (e.g., third layer) may be referred to as a pore window area or pore area. An aperture (which may also be referred to as a slit, pore, or gap) may be in or formed in a pore window area or pore area (e.g., in or formed in a first region). The aperture may be at any location within a first region. In an example, the aperture is centrally located with a first region.

A first region (e.g., first layer) of the polymer gel or polymer hydrogel and/or a second region (e.g., second layer) of the polymer gel or polymer hydrogel and/or a third region (e.g., third layer), if present, may comprise (e.g., the polymer gel or polymer hydrogel may be) one or more water-insoluble, crosslinked polymer gel(s) or one or more water-insoluble, crosslinked polymer hydrogel(s). For the first regions, second regions, and third regions, if present, the polymer gel or polymer hydrogel of each of the same regions may be the same or the polymer gel or polymer hydrogel of at least one of same regions is different than the other same regions.

Examples of polymer gels include, but are not limited to, cross-linked polysaccharide and protein gels, which may be naturally-occuring polysaccharide or protein gels, such as, for example, cellulose gels (e.g., carboxymethyl cellulose gels, hydroxyethyl cellulose gels, hydroxy propyl methyl cellulose gels, and the like), alginate gels (e.g., sodium alginate, calcium alginate, propylene glycol alginate, and the like), sodium hyaluronate, pectins, galactomannans, chitosan, gelatin, agarose, or synthetic crosslinked gels formed from acrylamide, acrylic acid and its derivatives (e.g., methacrylic acid, acrylic ester, sodium acrylate, and the like), ethylene oxide, ethylene glycol, vinyl alcohols, vinyl esters, vinyl ethers, and carboxy vinyl monomers, N-vinyl pyrrolidone, acylamidopropane sulphonic acid, Pluronic™ (tri-block copolymers of polyethylene glycol, polypropylene glycol and polyethylene glycol), maleic acid, N,N-dimethylacrylamide diacetone acrylamide, acryloyl morpholine, and combinations thereof. These examples of polymer gels may be polymer hydrogels.

The polymer(s) of the polymer gels or polymer hydrogels may have various molecular weights (e.g., $M_w$ and/or $M_n$). It is desirable that the polymer(s) have a molecular weight such that a suitable polymer hydrogel region/layer can be formed. For example, a first region (e.g., first layer) of the polymer hydrogel (e.g., polyacrylamide hydrogel) and/or the second region (e.g., second layer) of the polymer hydrogel (e.g., polyacrylamide hydrogel) comprise(s) (e.g., the first region and/or second region is) a crosslinked polyacrylamide hydrogel.

In an example, a first region (e.g., first layer) of first polymer hydrogel, which may be a cross-linked polyacrylamide gel or hydrogel, is more cross-linked (e.g., in the case where the polymer gel or hydrogel materials are the same) or less swellable and/or less expandable (e.g., in the case where the polymer gel or hydrogel materials are the same or different) than the second region (e.g., second layer) of second polymer gel or hydrogel, which may be a cross-linked polyacrylamide gel or hydrogel, and/or the third region (e.g., third layer) of third polymer gel or hydrogel, which may be a cross-linked polyacrylamide gel or hydrogel.

A first and/or second region may have various thicknesses. The apertures may have the same thickness or at least two or more of the apertures may have different thicknesses. For example, one or more (e.g., all) of the first regions comprises a first layer having a thickness of 0.001 to 2000 microns, including all 0.001 micron values and ranges therebetween, and/or one or more (e.g., all) of the second regions comprises a second layer having a thickness (e.g., a dimension perpendicular to the substrate) of 0.001 to 2000 microns, including all 0.001 micron values and ranges therebetween.

A first or second region may have various widths. The apertures may be the same width or at least two or more of the apertures may have different widths. For example, the width (e.g., a dimension parallel to the substrate) of the first region (e.g., first layer) is less than the width of the second region (e.g., the ratio of the width of the first region (e.g., first layer) to the second region (e.g., second layer) is 0.05 to 1 (e.g., 0.1 to 0.5), including all 0.1 values and ranges therebetween).

An aperture may have various sizes. The apertures may be the same size or at least two or more of the apertures may have different sizes. For example, each of the plurality of apertures has a size (e.g., at least one dimension parallel to the substrate) of 10 microns to 10 cm, including all integer micron values and ranges therebetween.

An aperture may have various aspect ratios. The apertures may have the same aspect ratio or at least two or more of the apertures may have different aspect ratios. For example, each of the plurality of apertures has an aspect ratio (width/length parallel to the substrate) of at least 1:2.

An aperture may have various shapes, which may be a cross-sectional shape. The apertures may have the same shape or at least two or more of the apertures may have different shapes. The apertures may be regular or irregular and/or symmetric or asymmetric. For example, a plurality of apertures has a shape chosen from a slit, rectangular, oval, kidney shaped, triangular, star shaped, and the like, and combinations thereof.

The apertures may comprise various amounts of the total area of a substrate. For example, the area of the plurality of apertures is 0.1 to 75% (e.g., 20 to 50%), including all 0.1% values and ranges therebetween, of the total area of the substrate.

A pore area, which may have an aperture, may comprise two or more (e.g., three) regions with the same or different swelling ratios. For example, a first region (e.g., first layer) of polymer gel or polymer hydrogel has a first swelling ratio and/or contraction ratio, a second region (e.g., second layer) of polymer gel or polymer hydrogel has a second swelling ratio and/or contraction ratio, and a third region (e.g., third layer) of polymer gel or polymer hydrogel, if present, has a third swelling ratio and/or contraction ratio. The first swelling ratio and/or contraction ratio and second swelling ratio and/or contraction ratio are different. The third swelling ratio and/or contraction ratio is the same as the second swelling ratio and/or contraction ratio or is different than the first swelling ratio and/or contraction ratio and second swelling ratio and/or contraction ratio. The swelling ratio is the change in weight percent and/or volume percent of the polymer gel or polymer hydrogel. The contraction ratio is the change in volume percent and/or the change in one or more dimension(s) of the polymer gel or polymer hydrogel.

For example, the first region (e.g., first layer) of first polymer gel or polymer hydrogel has less expansion and/or contraction and/or swelling than the second region (e.g., second layer) of second polymer gel or polymer hydrogel. In another example, the second region (e.g., second layer) of second polymer gel or polymer hydrogel and, if present, the third region (e.g., third layer) of third polymer gel or polymer hydrogel both have higher swelling and/or expansion and/or contraction than the first region (e.g., first layer) of first polymer gel or polymer hydrogel. In another example, the first region (e.g., first layer) of first polymer gel or polymer hydrogel has a higher degree of crosslinking that the second polymer gel or polymer hydrogel of the second region (e.g., second layer) and/or the polymer gel or polymer hydrogel of the third region (e.g., third layer). In any of these examples, the expansion/swelling of the second region (e.g., second layer) and third region (e.g., third layer) may be the same or different. In various examples, the second region (e.g., second layer) and/or third region (e.g., third layer), if the third region (e.g., third layer) is present, is/are independently 2-100 or 2-200 times more swellable and/or expansible than the first region (e.g., first layer) including all integer values and ranges therebetween. In various examples, the swelling and/or expansion ratio of the second polymer gel or polymer hydrogel and/or the swelling and/or expansion ratio of the third polymer gel or polymer hydrogel, if the third polymer gel or polymer hydrogel is present, is/are independently 2 times or greater than, 3 times or greater than, 4 times or greater than, 5 times or greater than, 6 times or greater than, 7 times or greater than, 8 times or greater than, 9 times or greater than, 10 times or greater than, 25 times or greater than, 50 times or greater than, 100 times or greater, or 200 times or greater than the swelling and/or expansion ratio of the first polymer gel or polymer hydrogel. In various examples, the swelling and/or expansion ratio of the second polymer gel or polymer hydrogel and/or expansion ratio of the third polymer gel or polymer hydrogel, if the third polymer gel or polymer hydrogel is present, is/are independently 2 to 150 (e.g., 2-100), including all integer values and ranges therebetween, times greater than the swelling and/or expansion ratio of the first polymer gel or polymer hydrogel. The expansion ratio is the change in volume percent and/or the change in one or more dimension(s) of the polymer gel or polymer hydrogel.

In various examples, a substrate comprises (or has) a LC/HC or LC/HC/LC. LC, which may be a second region or second region and third region, respectively, is/are, independently, a polymer gel or polymer hydrogel with low degree of crosslinking or lower degree of crosslinking than the HC polymer gel or polymer hydrogel. HC is a polymer gel or polymer hydrogel with high degree of crosslinking or higher degree of crosslinking than the LC polymer gel(s) or polymer hydrogel(s). In the case where the substrate has one or more aperture(s) or pore(s), the HC polymer gel or polymer hydrogel is disposed (e.g., coated) or forms on at least a portion of or all of the aperture(s) or pores (e.g., the inner wall of the aperture(s) or pore(s)).

An aperture may change size depending on the humidity or moisture state in which the aperture is found. For example, in a first state (e.g., a first humidity state, such as, for example, a dry state (e.g., ambient humidity or approximately 50% relative humidity)) each of the plurality of apertures have a first size (e.g., a first opening size) and in a second state (e.g., a second humidity state, such as, for example, a wet state (e.g., greater than approximately 70% relative humidity (e.g., 100% relative humidity or in contact with water)) each of the plurality of apertures have a second size (e.g., a second opening size). For example, the second size (e.g., at least one dimension such as, for example, a dimension perpendicular to the longest dimension of the aperture) is greater than the first size. For example, in the second humidity state (e.g., wet state) each of the apertures is circular or elliptical. For example, in each of the states the substrate is non-buckled (e.g., flat). In the second state (e.g., wet state) at least one dimension (e.g., a dimension perpendicular to the longest dimension of the aperture) of one or more or all of the apertures, which may be slits or rectangular apertures, may be 0 to 100%, including all 0.1% values and ranges therebetween, of the longest dimension of the aperture in the first state (e.g., dry state) or 0 to 200 times larger (e.g., 0.01 to 200 times larger, 0.1 to 200 times larger, 0.01 to 100 times larger, or 0.1 to 100 times larger), including all 0.01 and 0.1 values and ranges therebetween, than the longest dimension of the aperture in the first state (e.g., dry state). For example, in the second state (e.g., wet state) at least one dimension (e.g., a dimension perpendicular to the longest dimension of the aperture) of one or more or all of the apertures, which may be slits or rectangular apertures, are changed by 1 times or more, 2 times or more 3 times or more, 4 times or more, 5 times or more, 6 times or more, 7 times or more, 8 times or more, 9 times or more, 10 times or more, 25 times or more, 50 times or more, or 100 times or more. For example, on exposure of the substrate to certain humidity environments (e.g., a 70% or greater relative humidity (e.g., 100% relative humidity) or in contact with water the aperture size of one or more or all of the plurality of apertures changes (e.g., an aperture can open or close). For example, on a change in aperture size one or more or all of the dimensions of the substrate are unchanged or substantially unchanged (e.g., one or more or all of the dimensions of the substrate are changed by 5% or less, 4% or less, 3% or less, 2% or less, 1% or less, 0.5% or less, or 0.1% or less.) For example, the aperture size change is reversible (e.g., substantially reversible). In various examples, an aperture, a portion of a plurality of apertures, or all of the plurality of apertures is able to change size 5 or more times, 10 or more times, 20 or more times, or 50 or more times, where the size change may be substantially reversible (e.g., each size change is +/−10%, 5%, or 1% of the average size change).

The substrate may comprise (or be) a variety of materials. The substrate may comprise (or be) a fabric a film, or the like. The substrate may be stretchable and/or porous. Examples of substrates include, but are not limited to, fabrics (e.g. stretchable fabrics), films (e.g., polymer films), and the like. The substrate may be porous fabric, a stretchable fabric, or a stretchable porous fabric. The substrate may be polymer film.

A fabric may comprise various fibers. A fabric may comprise cotton fibers, nylon fibers, polyester fibers, viscose fibers, polyurethane fibers, or the like, or a combination thereof. A fabric may comprise natural fibers (e.g., cotton, flax, jute, wool, silk, linen, and the like, and combinations thereof), or synthetic fibers (e.g., polyester, nylon, polyolefin, acrylic, acetate, polyurethane, and the like, and combinations thereof), or semi-synthetic fibers (e.g., rayon, viscose, and the like, and combinations thereof), or the like, or a combination thereof.

A fabric may be a woven, knitted or non-woven fabric. For example, a fabric is a woven fabric and has a weave structure (e.g., sateen fabrics, twill fabrics, plain fabrics, and the like). For example, a fabric is a knitted fabric and has a knitted structure (e.g., a single jersey fabric, a double jersey fabric, and the like).

Figure 3:
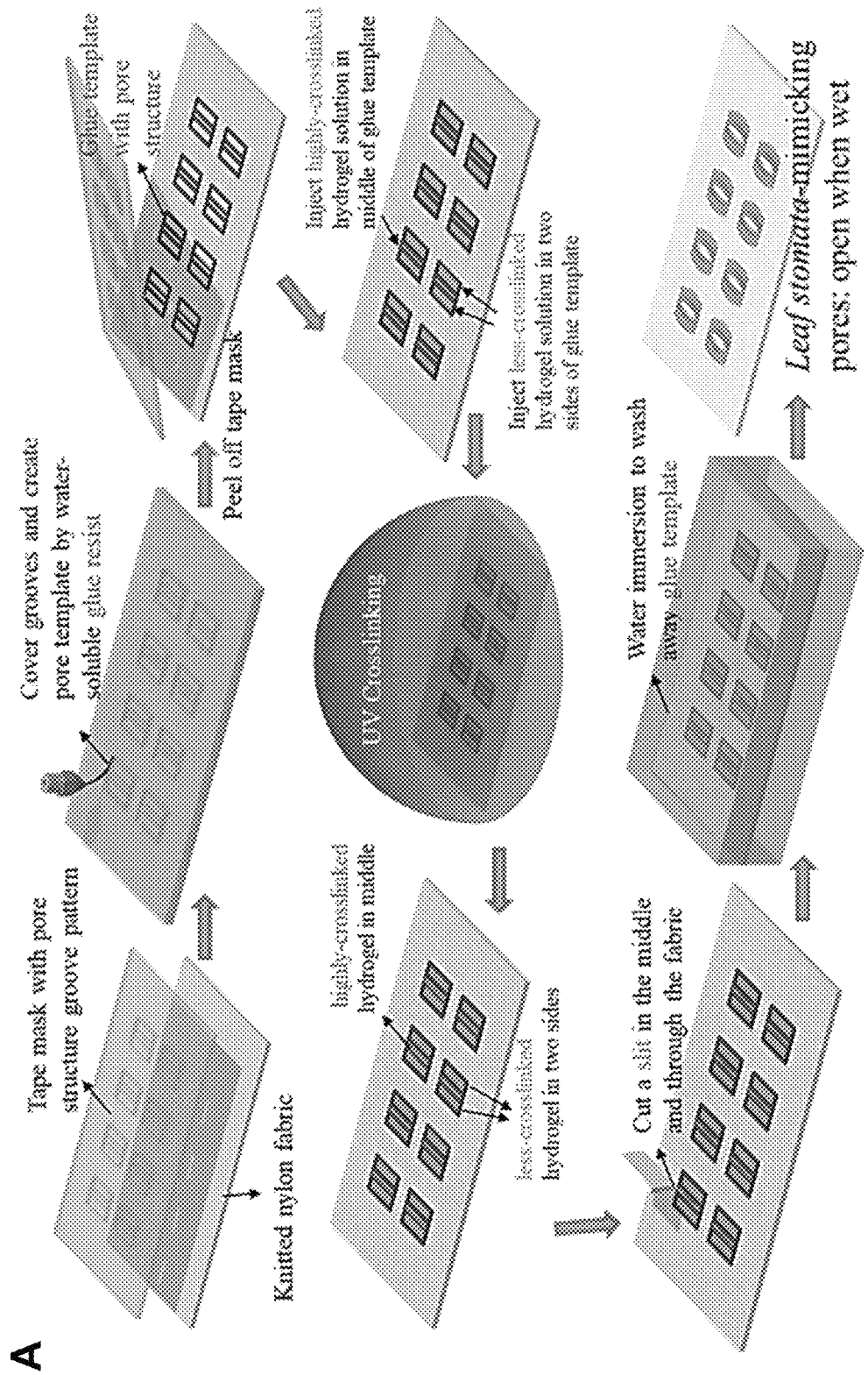
FIG. 3 shows fabrication, water response screening, and microstructures of knitted nylon fabrics with the pore areas coated by three-layer PAAm hydrogels. (A) Scheme to show the process of creating three-layer hydrogel coated pores on the nylon fabric to mimic leaf stomata. (B) Summary of water response of the pore windows coated by different combinations of no hydrogel (0), less crosslinked hydrogel (LC), more crosslinked hydrogel (HC), less crosslinked hydrogel plus PAAm polymer (LCP) and more crosslinked hydrogel plus PAAm polymer (HCP). The symbols –, +, and ++ represent pore close, slightly open, and largely open, respectively. Red circles (dashed lines) showed good combinations for pore open and close behaviors. (C) An image of a typical knitted nylon fabric with three-layer LC/HC/LC hydrogel coated pore structures; insets are schemes of the designed coating and dimension of the windows on the pore area. (D) SEM images of the neat nylon fabric, (benzophenone) BP pre-tread fabric, the inner and outer window areas in the designed three-layer hydrogel coated pores on the nylon fabric.
Figure 3:
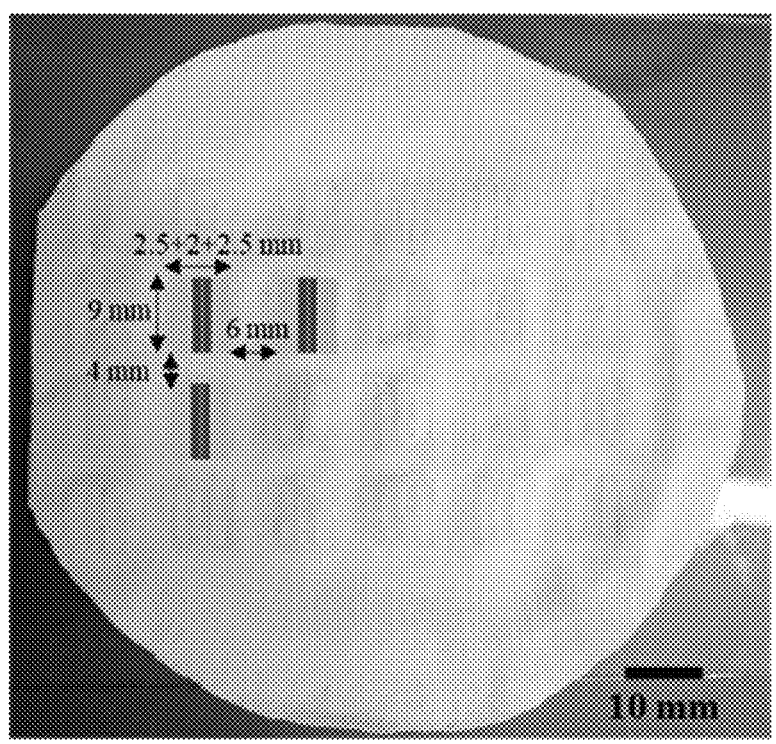
Figure 3:
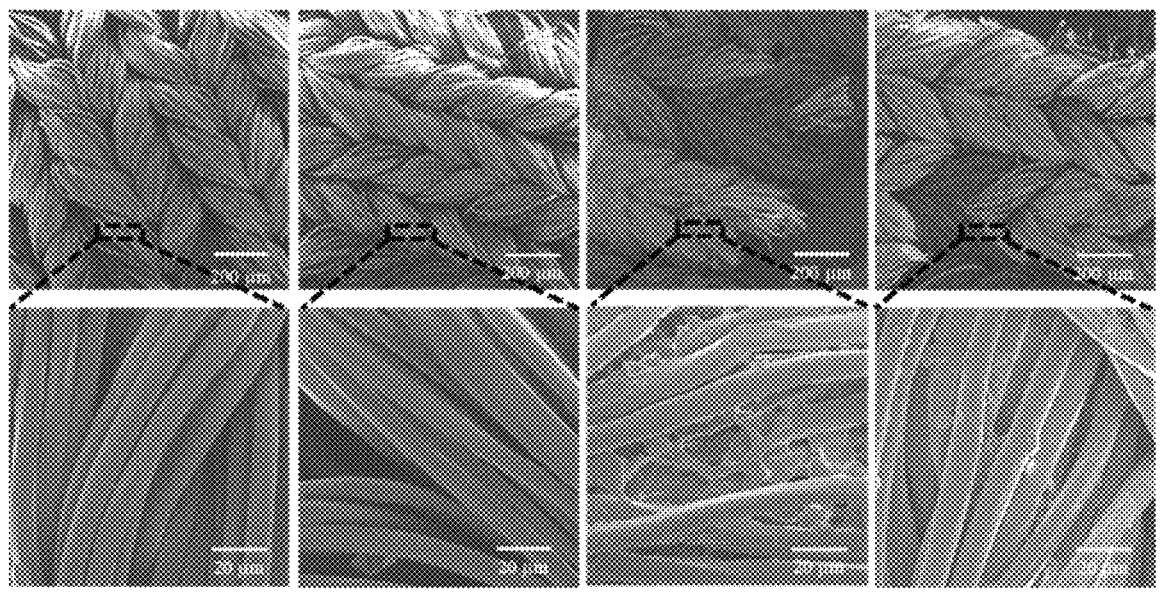
Figure 6:
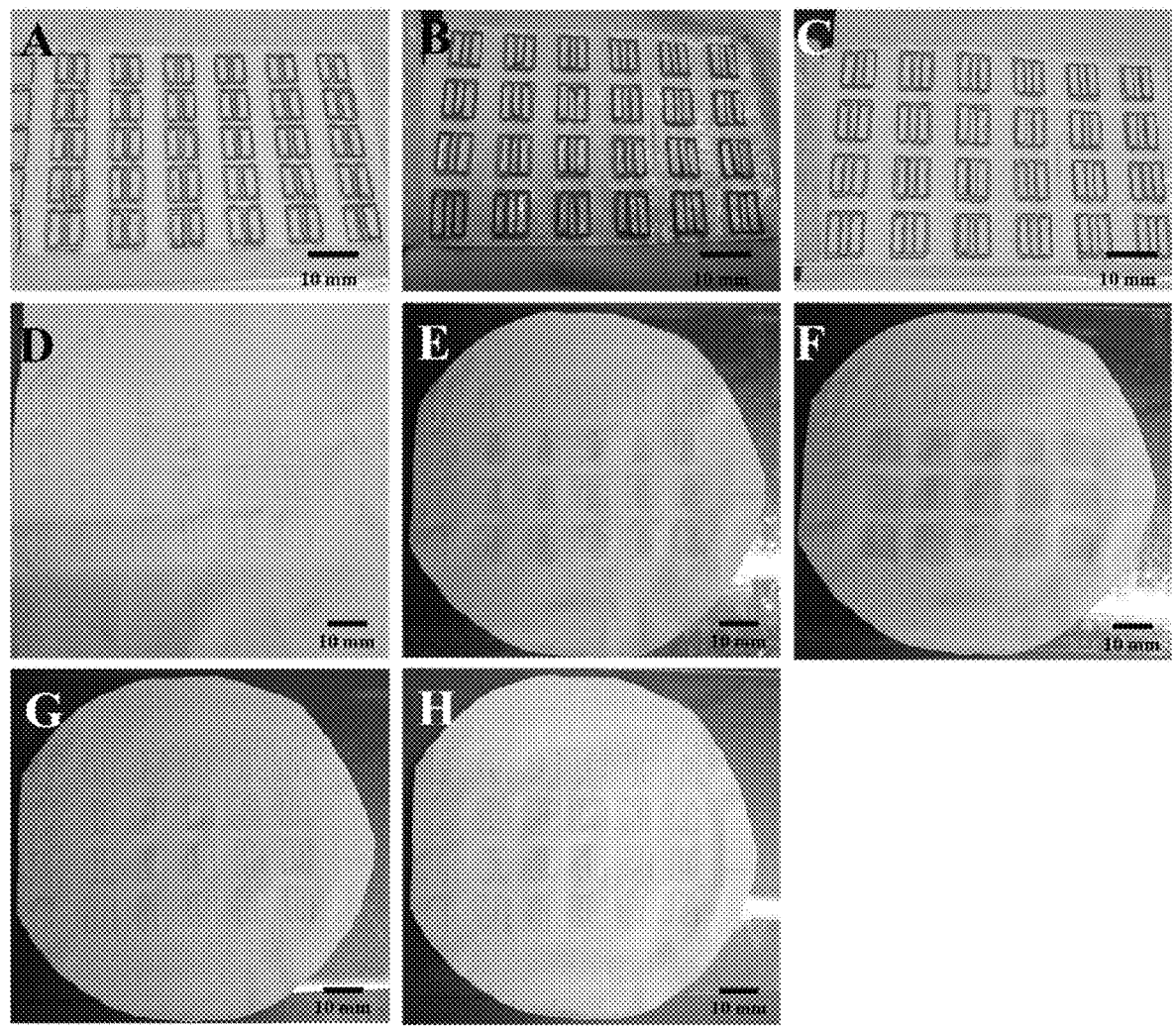
FIG. 6 shows coating of three-layer hydrogel on pore areas of the fabric and example of a fabrication process to create knitted nylon fabrics with the pore areas coated by three-layer PAAm hydrogels. (A) Cover nylon fabric with a laser-cut tape mask with patterned window structure. (B) Extrude a glue resist into the grooves of the window patterns. (C) Solidify the glue in air. (D) Form the glue template with patterned windows after peeling off the mask. (E) Inject and cure the HC hydrogel solution in the inner window of the glue templates. (F) Inject and cure the LC hydrogel in the two outer windows of the glue templates. (G) Form the three-layer hydrogel coated windows after hydrogel completely curing. (H) Cut slits in the middle of the inner HC hydrogel layer to form leaf stomata-mimicking pores.

In an aspect, the present disclosure provides methods of making substrates. The substrates may be substrates of the present disclosure. In various examples, a substrate (e.g., a substrate of the present disclosure) is made by a method of the present disclosure. Non-limiting examples of methods of making substrates are described herein. For example, methods of making substrates is shown in FIG. 3A and FIG. 6.

An example of a method of making a substrate comprises: forming a region of a first polymer gel or polymer hydrogel precursor, crosslinking the first polymer gel or polymer hydrogel precursor on at least a portion of a substrate, which may have a photoinitiator (e.g., benzophenone) disposed thereon; crosslinking the first polymer precursor; forming a region of a second polymer gel or polymer hydrogel precursor, crosslinking the second polymer gel or polymer hydrogel precursor on at least a portion of the substrate; crosslinking the second polymer precursor; optionally, forming a region of a third polymer gel or polymer hydrogel precursor, crosslinking the third polymer gel or polymer hydrogel precursor on at least a portion of the substrate; if a first hydrogel precursor is used, crosslinking the third polymer precursor; and, optionally, forming one or more apertures. One or more or all the forming a region(s) may be carried out so discrete regions are formed (e.g., by using a mask or template). The crosslinking may be carried out by exposing the region to ultraviolet light. The wavelength(s) of ultraviolet light may be selected based on the photoinitiator used. The hydrogel precursor may be a polymer and a crosslinker (e.g., N'-methylene bisacrylamide (MBA)) and, optionally, a photoinitiator (e.g., Darocur® 1173). A polymer gel or polymer hydrogel precursor may be a polymer. A cross-linked polymer gel may be used instead of a polymer gel or polymer hydrogel precursor. In this case, the crosslinking and the crosslinker may or may not be required. The swelling and/or contraction (e.g., swelling ratio and/or contraction ratio) of a particular region may be selected by choice of the polymer, crosslinker and/or amount of crosslinker, if the crosslinker is present.

In an aspect, the present disclosure provides uses of substrates. In various examples, an article of manufacture comprises one or more substrate(s) of the present disclosure. The article of manufacture may be a breathable article of manufacture.

In various examples, articles of manufacture comprise one or more fabric(s) of the present disclosure. An article of manufacture may be a wearable article, such as, for example, an article of clothing (e.g., a waterproof or oil-proof article of clothing), or the like. The wearable article may a protective wearable article. In various examples, wearable articles include, but are not limited to, rainwear, outerwear, outdoor clothing, sportswear, skiwear, hiking wear, under garments (e.g., underwear, undershirt, and the like), socks, t-shirts, hats, gloves, mittens, jackets, coats, ponchos, or the like.

An article of manufacture may be an outdoor equipment article. In various examples, outdoor equipment articles include tents, tarps, sleeping bags, and the like. Other examples of articles of manufacture include medical articles, such as, for example, wound dressings and the like, packaging articles, such as for example, food packaging materials and the like, building articles, such as, for example, roofing materials and the like, filtration/separation articles, such as, for example, filtration/separation media and the like, and the like.

The steps of the method described in the various embodiments and examples disclosed herein are sufficient to produce a substrate of the present disclosure. Thus, in an embodiment, a method consists essentially of a combination of the steps of the methods disclosed herein. In another embodiment, a method consists of such steps.

The following examples are presented to illustrate the present disclosure. The example is not intended to be limiting in any matter.

EXAMPLE 1

This example provides examples of substrates of the present disclosure, characterization of same, methods of making same, and uses of same.

Described in this example are the design and fabrication of novel artificial leaf stomata on fabric surface, the pores of which open and close depending on the surrounding humidity. Its working mechanism is based on the differential swelling and bending of the "guard cells" as that in the real leaf stomata. The moisture permeability of a fabric with artificial leaf stomata increased by up to 56% when the pores opened under wet condition in comparison with that when the pores are closed under dry condition. This moisture responsive fabric can have a direct application in smart functional clothing such as sportswear.

A breathable fabric with smart pores to mimic the structure and function of leaf stomata for regulating the pore open and close behavior under different humidity conditions was developed. A single material, polyacrylamide (PAAm) hydrogel, with two different crosslinking levels to form a three-layer system and integrated it into a stretchable knitted nylon fabric (FIG. 1B). Because of the different swelling, the two hydrogels have different expansion abilities under humid condition, with an outer layer of less cross-linked (LC) PAAm hydrogel having a swelling more than 100 times of that of an inner layer of more crosslinked (HC) counterpart after the full expansion. When the constructs were coated on the fabric pore window areas, the swelling difference led to an asymmetric bending towards outer layer direction under higher humidity (wet), and therefore the middle slit (pore) opens. While under the normal humidity (dry), the pore stays closed status. In both conditions, the fabric maintains a flat surface without buckling, which has little effect on the overall dimension of the fabric.

Figure 2:
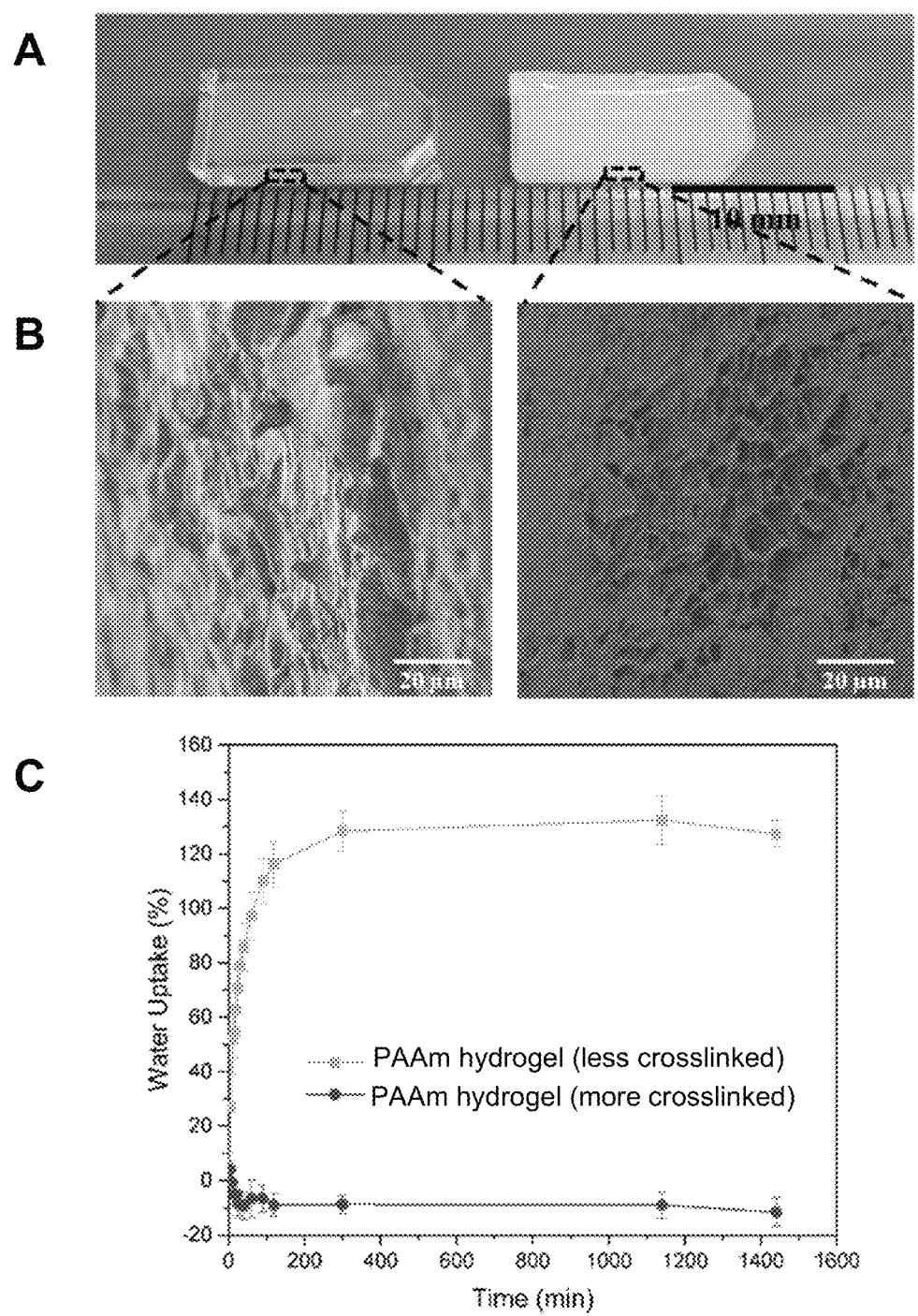
FIG. 2 show images, microstructure, and water behavior of differently crosslinked polyacrylamide (PAAm) hydrogels and a three-layer sandwiched hydrogel composite. (A) Photo images and (B) SEM morphologies of less crosslinked (left) and more crosslinked (right) PAAm hydrogels, respectively. (C) Water uptake profiles (swell ratios) of these two hydrogels. (D) The surface and cross views of the three-layer sandwiched hydrogel composite. (E-G) Water behavior of the pores (slits) cut in the middle of less cross-linked (left), more crosslinked (middle) and three-layer (right) PAAm hydrogel pieces with the same dimensions (4 mm wide×7 mm high×1 mm thick) in (E) as prepared, (F) wet (contacting with water for 10 min (min=minute(s)) and (G) dry conditions, respectively; the right schemes explain the response of the pore in the three-layer hydrogel pieces.
Figure 2:
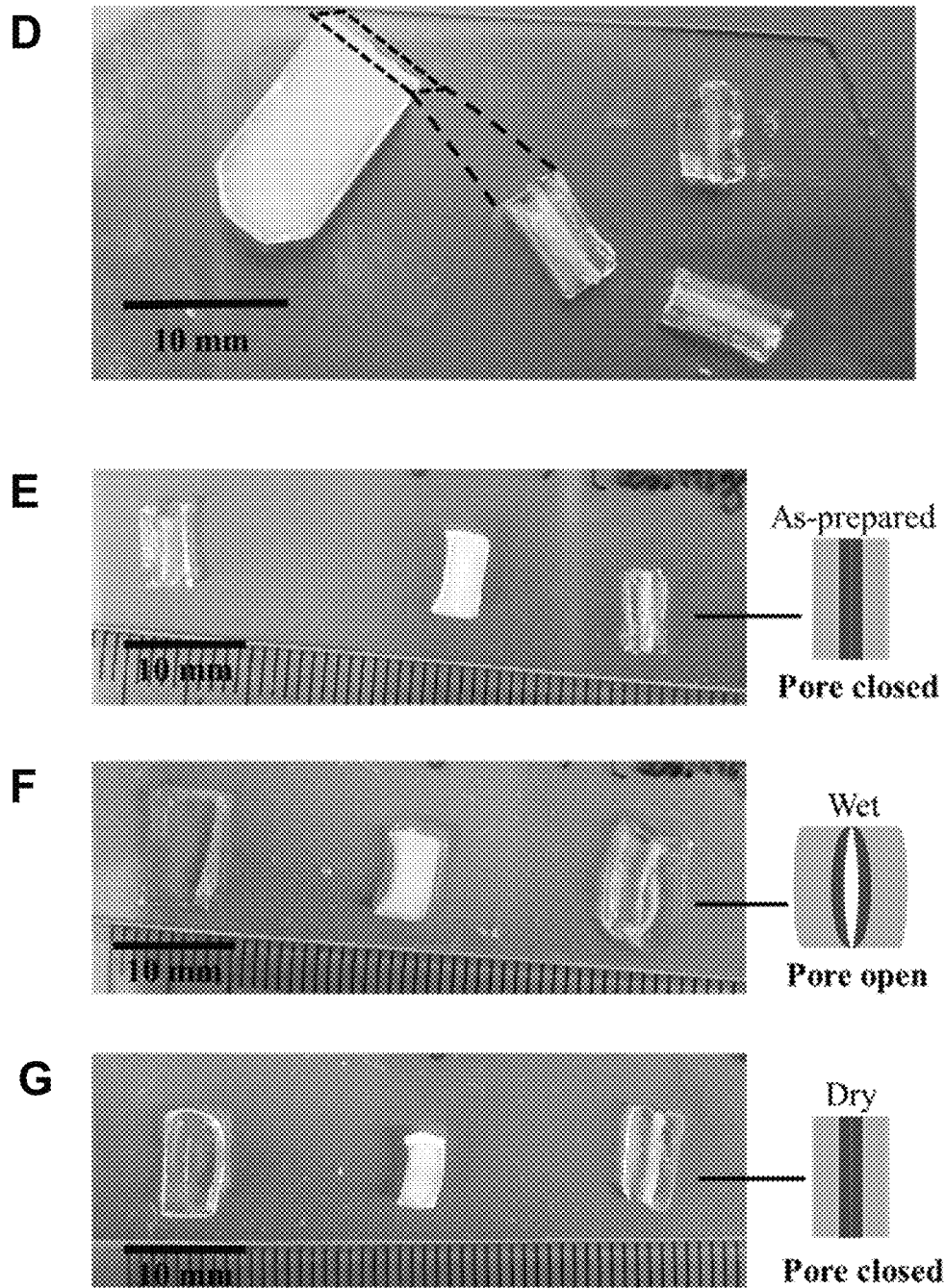
Figure 5:
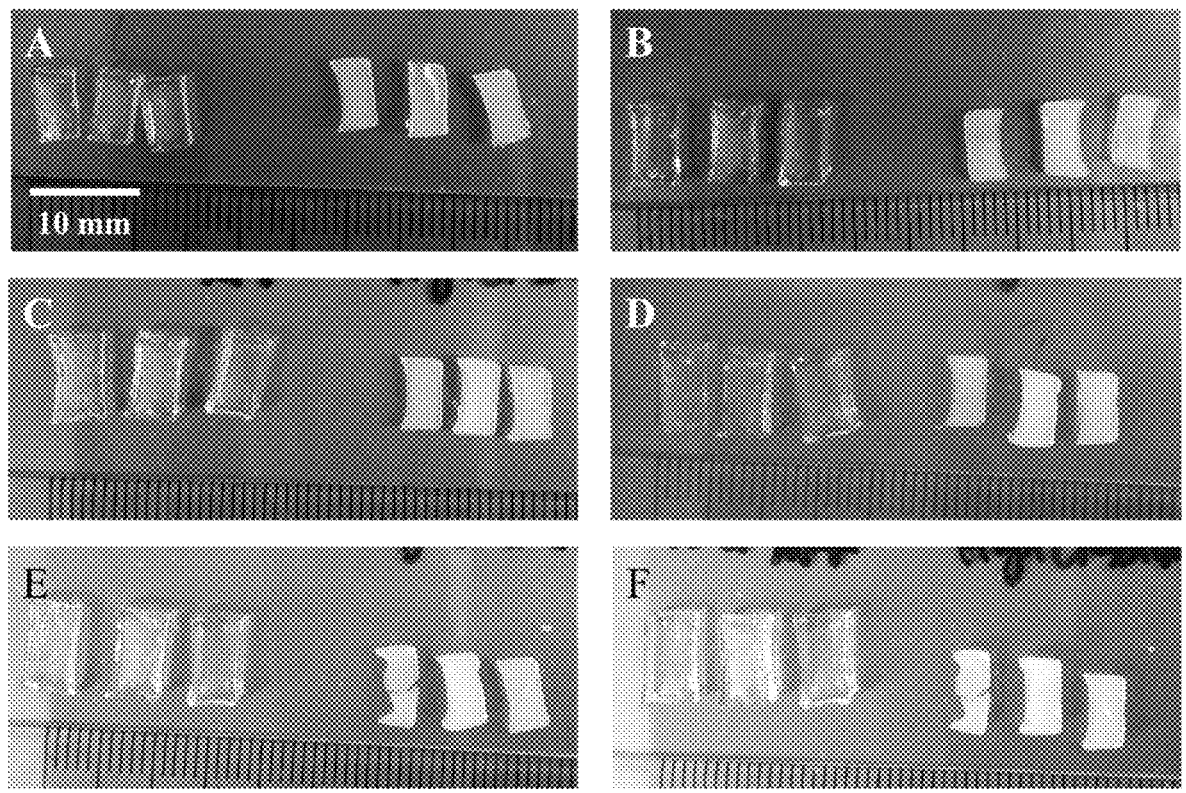
FIG. 5 shows water behavior of polyacrylamide (PAAm) hydrogels with two different crosslinker loadings and images of three parallel samples for less crosslinked (left) and more crosslinked (right) PAAm hydrogels after water uptake for (A) 0 min, (B) 10 min, (C) 20 min, (D) 40 min, (E) 60 min and (F) 120 min, respectively.

Results. Study of three-layer sandwiched hydrogels. Ultraviolet (UV) photo-polymerization was used to synthesize the polyacrylamide hydrogels using a previous protocol with a crosslinker, N,N'-methylene bisacrylamide (MBA) and a photoinitiator, Darocur® 1173. The formula was adjusted with a difference in crosslinker loading. The less crosslinked (LC) hydrogel having the MBA crosslinker loading of 0.12 wt % showed a transparent appearance, while the more crosslinked (HC) sample with MBA of 1.2 wt % turned to a white color (FIG. 2A). The microstructure did not vary, with both showing a porous morphology after frozen-dry (FIG. 2B). The water uptake (swell ratios) differed between different samples (significance level $p<0.05$) (FIG. 2C). The LC sample easily absorbed water and swelled, and reached almost 130% of the original weight after 120 min; whereas the HC samples did not swell and was stable in its weight (the images can be found in FIG. 5).

A step-by-step UV cure of the two hydrogel solutions was carried out and a three-layer hydrogel composite fabricated in a mold (15 mm wide×7 m high×4 mm deep). The cross-section view of the sample (4 mm wide×7 mm high×1 mm thick) clearly demonstrated the sandwiched structure (FIG. 2D), with the inner layer of white HC and two outer layer layers of transparent LC PAAms, respectively (noted as LC/HC/LC sandwiched hydrogel composite), respectively, corresponding to the appearance in the neat samples (FIG. 2A). A knife was used to cut a slit (6 mm) in the middle of the inner layer on a piece of the three-layer composite, and compared the water response of the slit (pore) with those cut in same length in the two neat hydrogel pieces with the same shape and thickness (FIG. 2E). When the samples were contacted with water for 10 min, the slits in the two neat samples did not change, with only the whole piece of the LC hydrogel swelling (FIG. 2F, left and middle samples); however, the sandwiched hydrogel composite responded, with the inner HC hydrogel walls separated, leading to an enlarged slit (FIG. 2F, right sample). When most of the external water was evaporated after 1 h (h=hour(s)) (not completely dry), the inner HC hydrogel walls closed up (FIG. 2G, right). This phenomenon was illustrated by the nearby schemes, which was similar as pore behavior in leaf stomata, i.e., the pores open in wet (humid) and close in dry conditions, respectively.

Coating of three-layer hydrogel on pore areas of the fabric. Leaf stomata-mimicking pores with the three-layer hydrogel structure were fabricated using a knitted nylon fabric following the scheme process in FIG. 3A (also FIG. 6, for real sample processing). The clean fabrics were first pre-activated by a benzophenone (BP)/ethanol solution. To prevent hydrogel solutions spreading on the fabric, a glue template with three parallel windows (total 7 mm wide×9 mm high, inner window 2 mm wide, outer window 2.5 mm wide) was firstly patterned on the fabric via pasting and solidifying the glue under an assistance of a laser-cut patterned tape mask. The HC and LC hydrogel solutions were injected in the inner and outer window of the glue templates, respectively and were cured under 365 nm UV for 10 min in a sequential order. After all the hydrogels have been cured, a slit with the same length of 9 mm was cut in the middle of the inner HC hydrogel layer, and the glue resists was washed away under a water bath.

Figure 7:
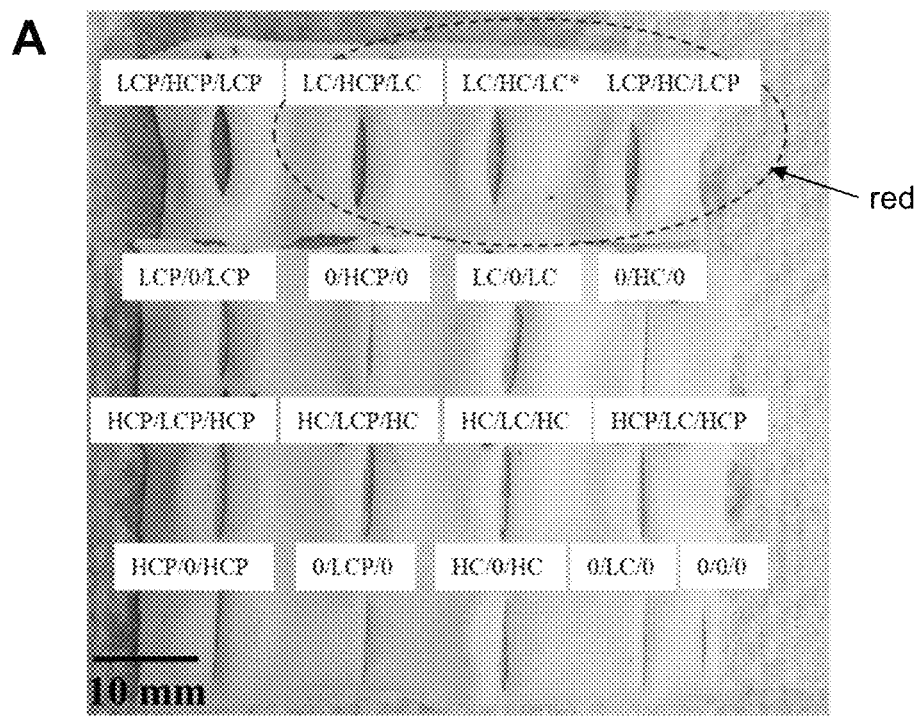
FIG. 7 shows coating of three-layer hydrogel on pore areas of the fabric and water response of the pore windows coated by different combinations of no hydrogel (0), less crosslinked hydrogel (LC), more crosslinked hydrogel (HC), less crosslinked hydrogel plus PAAm polymer (LCP) and more crosslinked hydrogel plus PAAm polymer (HCP) under (A) wet and (B) dry conditions, respectively. Red circles (dashed lines) showed good combinations for pore open and close behaviors. * represents the hydrogel combination used in the following experiments.
Figure 7:
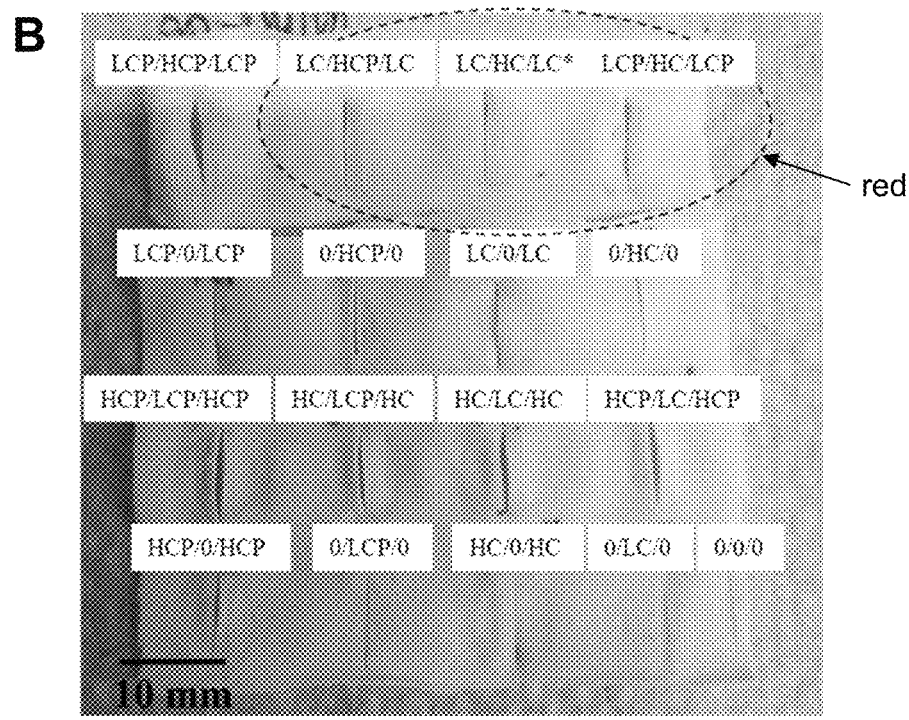

The water behavior for the pores coated by different combinations of LC and HC PAAm hydrogels (FIG. 3B), and FIG. 7) was screened. Also the effect with the addition of PAAm polymer in the hydrogel solutions (noted as LCP and HCP for less crosslinked and more crosslinked solutions, respectively) was compared. It was found the pores did not respond to the water if only the inner window was coated either by the LC, HC, LCP, or HCP hydrogels. The pores slightly opened when only the two outer windows were filled with LC and LCP hydrogels, however, did not respond either when filled with HC and HCP hydrogels. When the inner windows were coated with LC or LCP hydrogels, and the outer windows were coated with HC or HCP hydrogels, the pores enlarged slightly when contacting with water, however they remained open when the fabrics were dry. Only when the windows were coated in reversed order, i.e. inner with HC or HCP, and outer with LC or LCP hydrogels, the pores can be largely open when getting wet and closed when back to dry (noted by red (dashed) circles in FIG. 3B). The addition of PAAm polymer did not make a difference, even receded the closing for LCP/HCP/LCP sample (HCP for inner and LCP for two outer windows, respectively). In this matter, HC and LC hydrogel combination for the inner and outer window coatings (LC/HC/LC), respectively, was chosen for further experiments, as noted by * in FIG. 3B.

Figure 8:
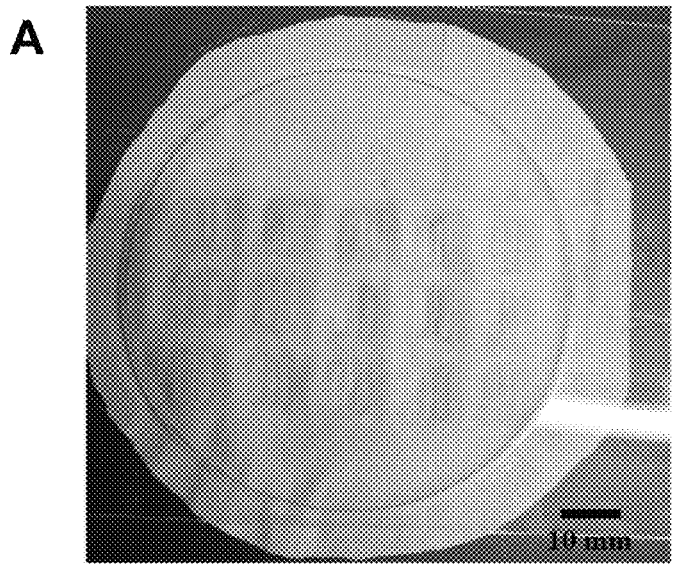
FIG. 8 shows coating of three-layer hydrogel on pore areas of the fabric and (A) an image of back side of a typical knitted nylon fabric with three-layer LC/HC/LC hydrogel coated pore structures (LC is low or less crosslinked hydrogel, HC is high or more crosslinked hydrogel). (B) SEM images of back side of the neat nylon fabric, BP pre-tread fabric, the inner and outer window areas of the three-layer hydrogel coated pores on knitted nylon fabrics.
Figure 8:
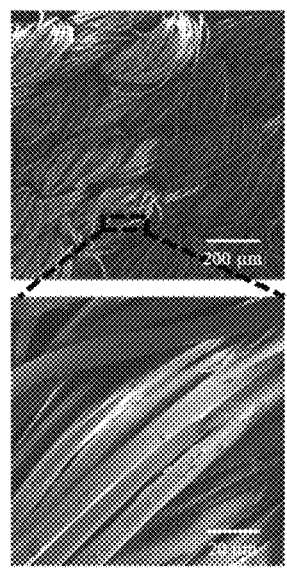
Figure 8:
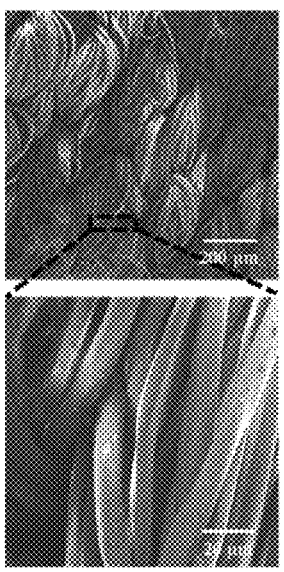
Figure 8:
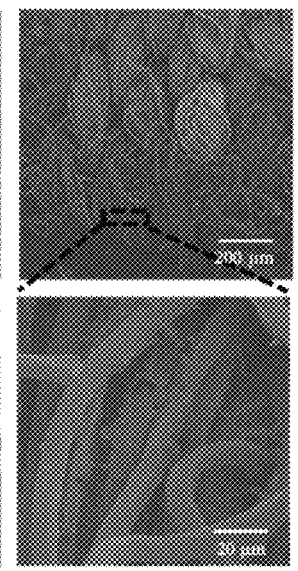
Figure 8:
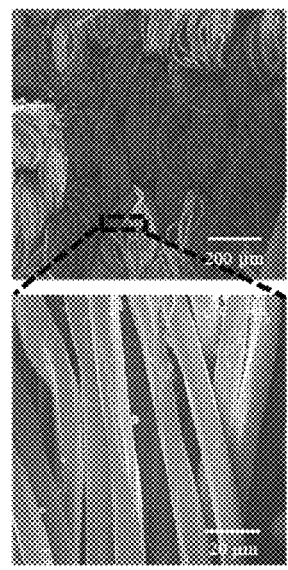

FIG. 3C showed a typical fabric sample with the pore windows (7 mm wide×9 mm high) coated with the three-layer PAAm hydrogel (LC/HC/LC combination). The fabric kept a flat, non-buckling surface. The horizontal and vertical distances between each window are 6 mm and 4 mm, respectively. FIG. 3D showed SEM morphologies for the fabric before and after hydrogel coating. Both the neat and BP pre-treated knitted nylon fabrics showed a smooth fiber surface, whereas the hydrogel coated window areas turned to a rougher fiber surface, with hydrogel materials connecting between fibers. The hydrogel solutions also penetrated through the fabric, as the back side of the both window areas also showed rough morphologies (FIG. 8B). No significant morphology difference was found between the HC and LC hydrogel coated inner and outer window areas, respectively.

Figure 4:
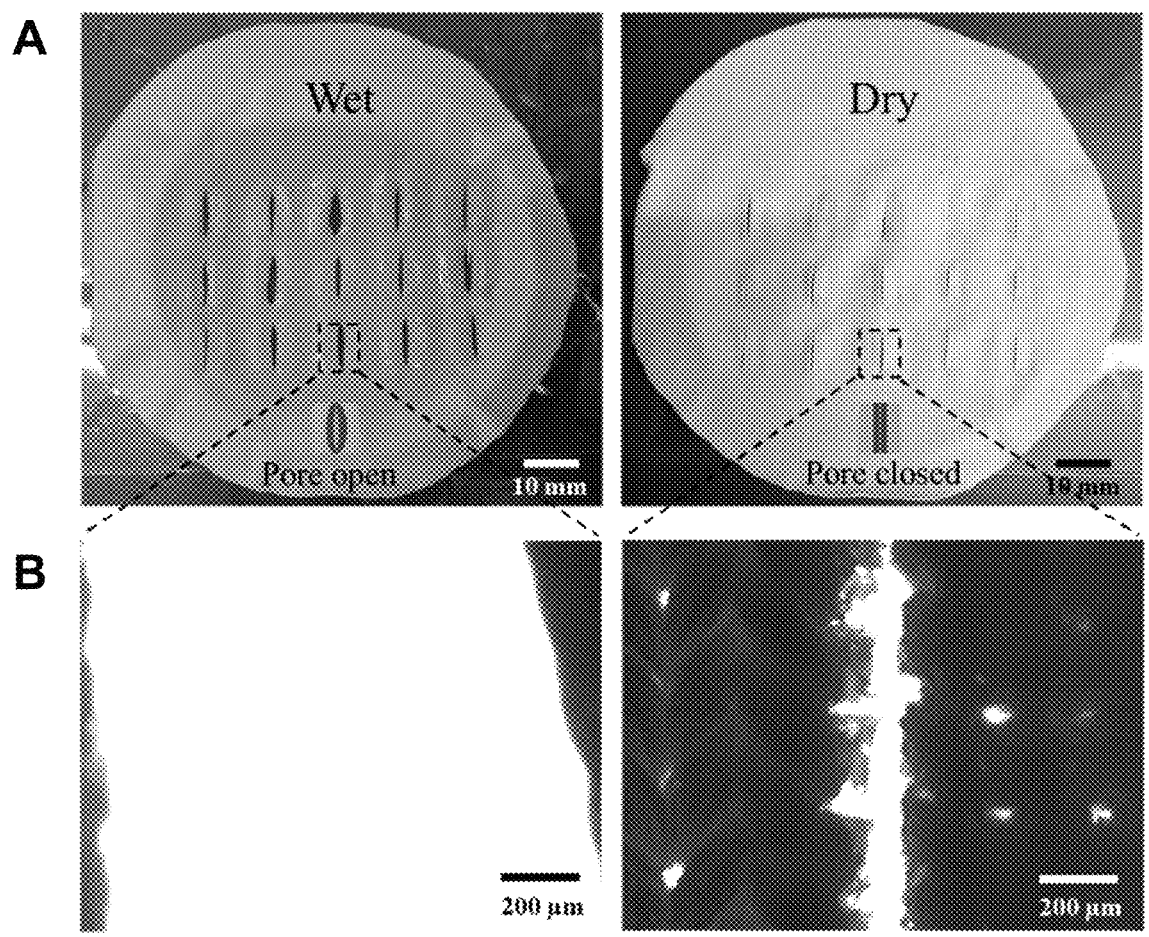
FIG. 4 shows an effect of water response on the vapor or air permeability of knitted nylon fabrics with the pore areas coated by three-layer PAAm hydrogels. (A) Images of a typical knitted nylon fabric with three-layer LC/HC/LC hydrogel coated pore structures under wet (left) and dry (right) conditions, respectively; insets are schemes to show the pore responses. (B) Optical images of the pore responses under wet (left) and dry (right) conditions, respectively. (C) Water vapor transmission rates and (D) Air permeability profiles for control knitted nylon fabric, control fabric with slit, and fabric with slit and pore areas coated with three-layer hydrogels under both dry and wet conditions, respectively.
Figure 4:
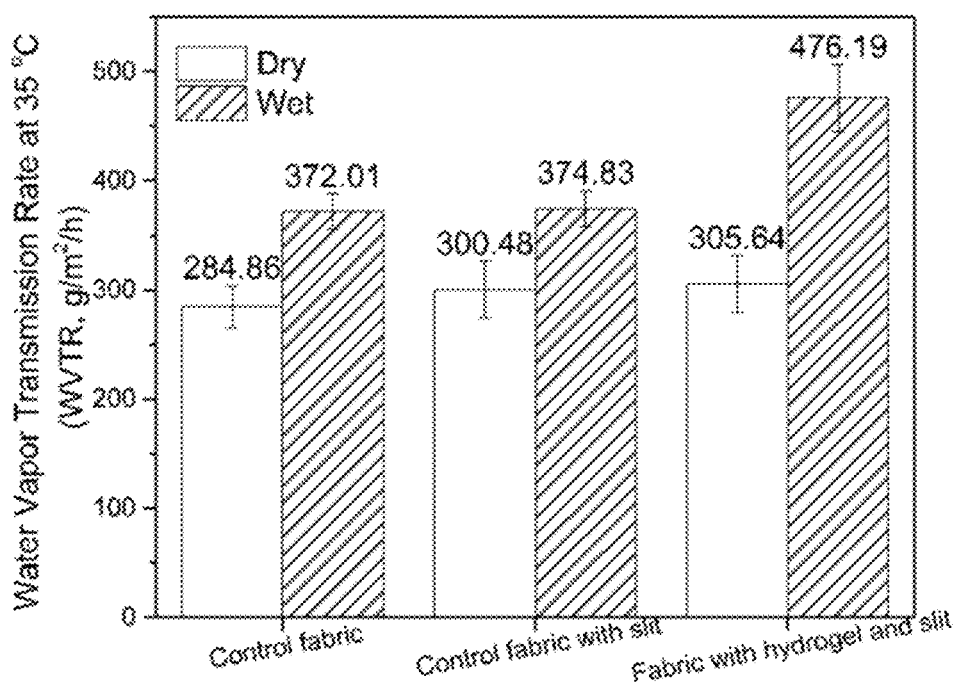
Figure 4:
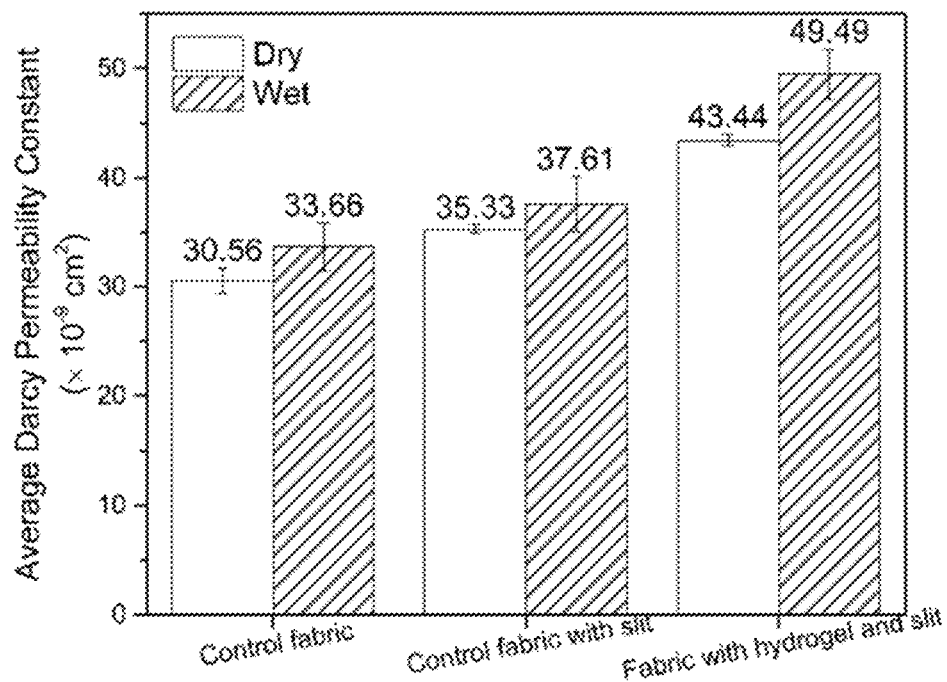
Figure 9:
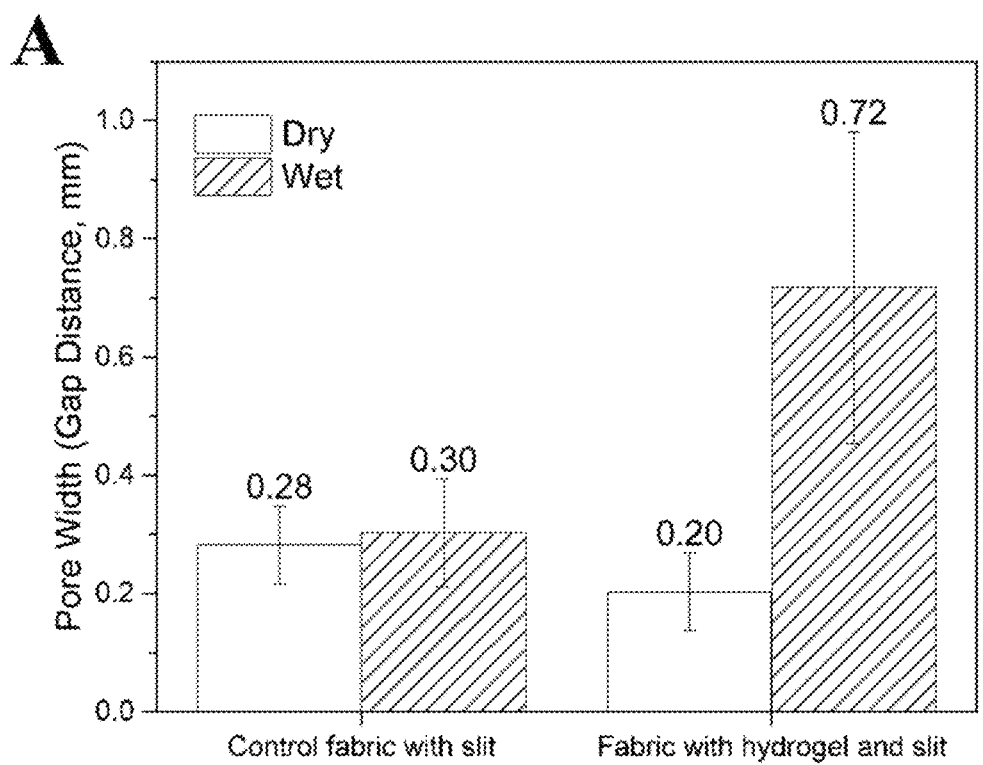
FIG. 9 shows performance of the fabric with three-layer hydrogel coated pore structure and (A) pore width (slit gap distance) of control fabric with slits, and fabric with slit and pore areas coated with three-layer hydrogels under both dry and wet conditions, calculated from optical microscopy. (B-E) Optical images of the pore responses of (B, D) Control knitted nylon fabric and (C, E) Control fabric with slits under (B, C) dry and (D, E) wet conditions, respectively.
Figure 9:
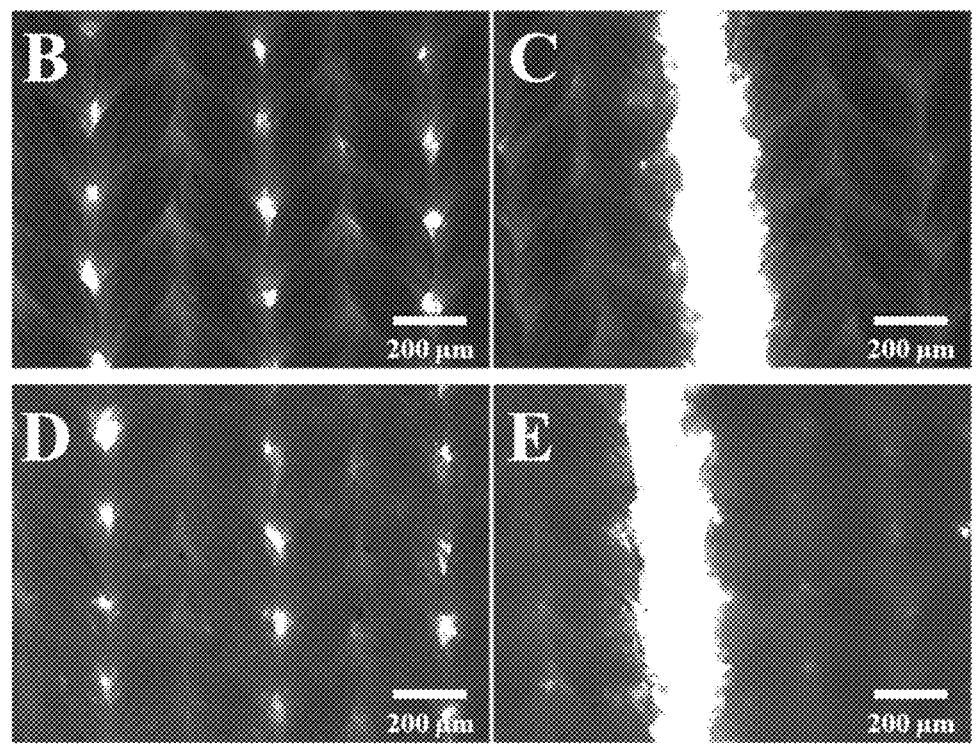

Performance of the fabric with three-layer hydrogel coated pore structure. The water response of the fabric with the pore windows coated with the three-layer LC/HC/LC PAAm hydrogels were further studied, in terms of dimension change, and effect to vapor and gas permeability. When the sample was contacted with water for 10 min, the slits enlarged leading to the pores open (FIG. 4A, left). The optical microscopy reveals the average pore size increased to 0.72 mm (FIG. 9A), with the largest pore over 1.30 mm (FIG. 4B, left image), 5.5 times larger than the 0.20 mm that of the as-prepared sample. After the sample was dried at room temperature for 1 h, the pores closed to an average of 0.20 mm (FIGS. 4A and 4B, right images, and FIG. 9A), similarly as the original size. The control fabric and fabric with slit only did not change the pore and slit dimensions (FIG. 9). The opening and closure behavior of the artificial stomata was run at least 20 wet and dry alternation cycles, indicating the responsiveness is durable.

Figure 10:
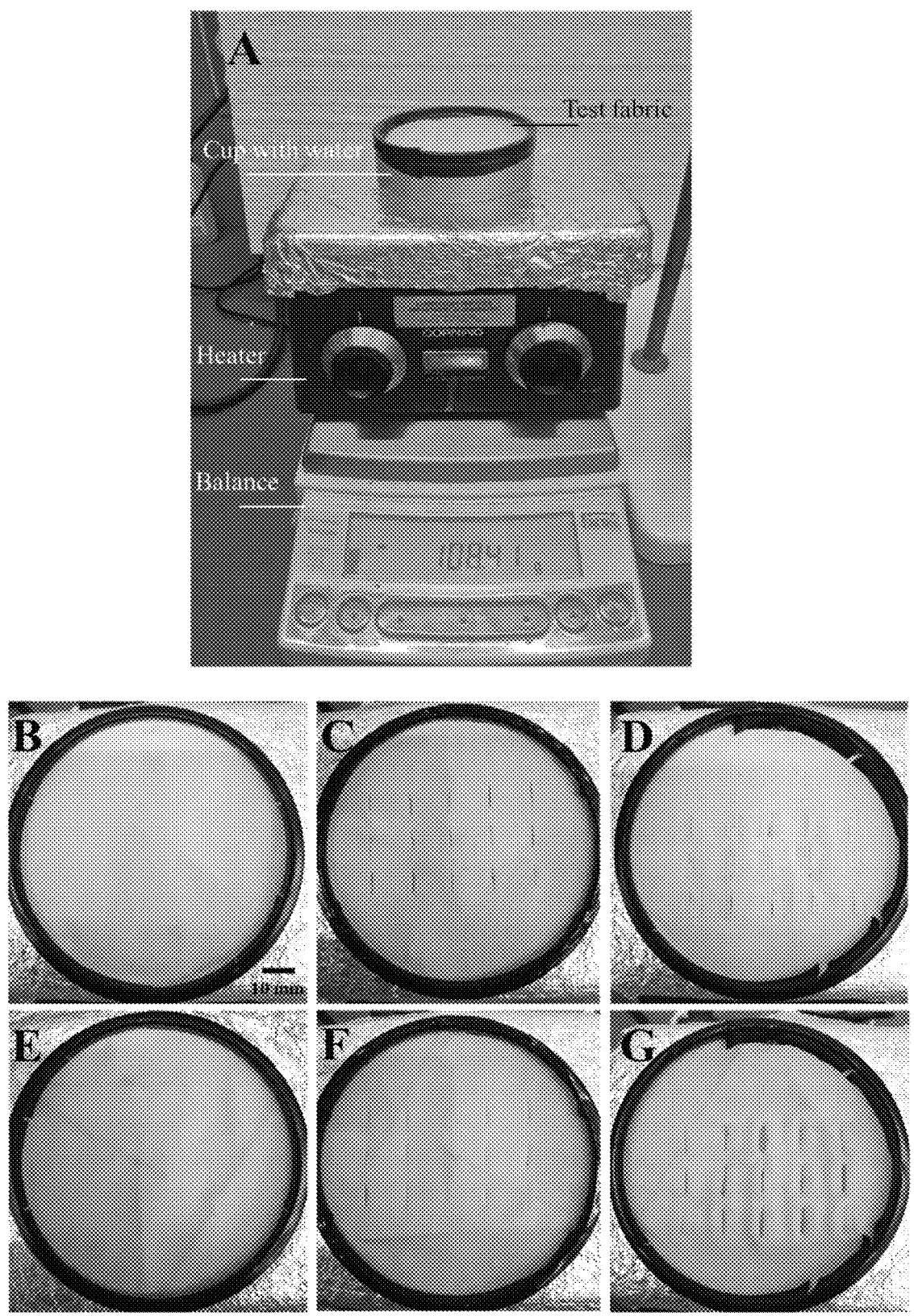
FIG. 10 shows performance of the fabric with three-layer hydrogel coated pore structure and (A) experimental set-up for measuring water vapor transmission rate (WVTR) of the fabrics at 35° C. (B, E) Control knitted nylon fabric, (C, F) Control fabric with slits and (D, G) Fabric with slits coated with three-layer hydrogels. The fabrics were covered on the cups for tests under (B-D) dry and (E-G) wet conditions, respectively.

The breathability of the designed fabric with hydrogel coated pores was evaluated by measuring either water vapor or air permeability. For measurement of water vapor transmission rate (WVTR), an upright cup method was employed according to BS 7209 standard, however a heater was used to elevate temperature to 35° C. to simulate the human skin temperature (FIG. 10A). The neat nylon fabric with and without slit cut were also tested as controls (FIGS. 10B and 10C). The WVTR was calculated using the following equation:

$$WVTR = \frac{M}{At} \quad (1)$$

where WVTR is the transmission rate of water vapor (g/m²/h), M the loss in mass (g), t the time duration (h), and A the area of the exposed test fabric which is equal to the internal area of the dish (m²). The results were averaged from three parallel tests.

From FIG. 4C, it was found the fabric with the slits (15 slits on a 90 mm circular sample) regardless of hydrogel coating had a similar vapor transmission rate as the control fabric (280-306 g/m²/h) (p>0.05) under initial dry condition. This means the gaps between the yarns by the slits did not affect too much on the permeability, probably because the knitted fibrous system has already been very breathable as it was very porous (FIG. 9B). When all the fabrics were wet, the transmission rates all increased, which should be attributed to the surface vapor evaporation. However, compared with both control samples (372 and 375 g/m²/h), the sample with the hydrogel coated pores showed a much higher permeability (477 g/m²/h) (p<0.05), being 56% greater than that at the dry condition. Obviously, it was because the openness of the pores under the wet condition increased the chance for the underneath vapor to transmit out (FIG. 10G).

Figure 11:
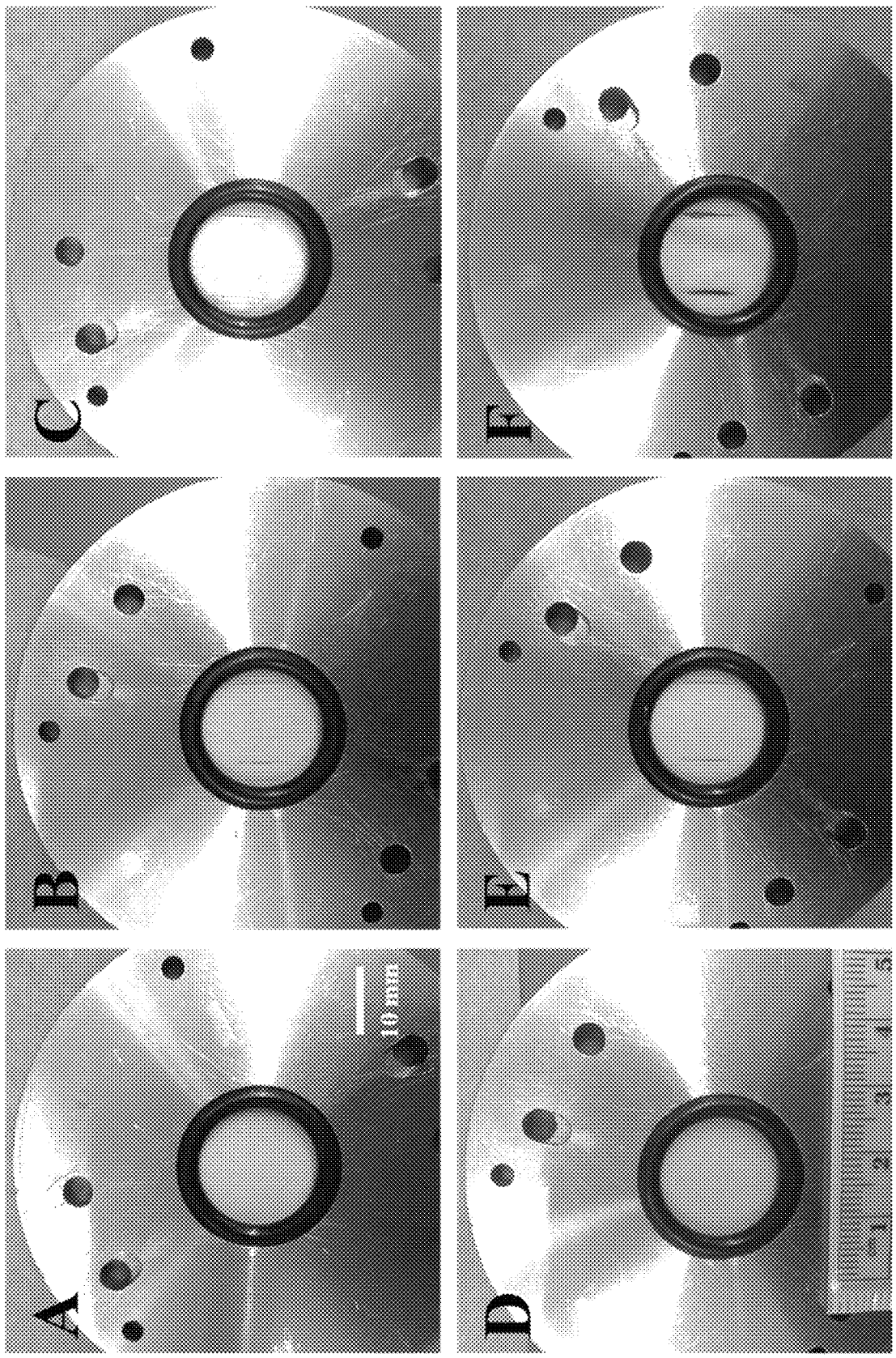
FIG. 11 shows performance of the fabric with three-layer hydrogel coated pore structure and fabric samples fixed in the capillary flow porometer chambers for air permeability test. (A, D) Control knitted nylon fabric, (B, E) Control fabric with slits and (C, F) Fabric with slits coated with three-layer hydrogels, under (A-C) dry and (D-F) wet conditions, respectively.

The air permeability was tested via a gas permeability module on a Capillary Flow Porometer. Similarly, a circular area (18.3 mm) of fabric with two slits coated with three-layer hydrogels was compared with the control fabric and the fabric with only two slits, both under dry and wet atmospheres (FIG. 11). The generated results were Darcy's Permeability Constant, calculated using the following equation:

$$C = \frac{8FTV}{\pi D^2(P^2 - 1)} \quad (2)$$

where C is Darcy's Permeability Constant (Darcy or cm², 1 Darcy=9.87×10⁻⁹ cm²), F the air flow (CC/s), T the sample thickness (mm, measured 0.39 mm for the nylon fabrics), V the air viscosity (0.0185 CP for air), D the sample diameter (mm), and P the pressure (atmospheres, psi). The results were averaged from three parallel tests.

As shown in FIG. 4D, the trend of the air permeability constant was similar as that of the WVTR test, i.e. the designed fabric with pores coated with three-layer hydrogels have a higher permeability (>43×10⁻⁹ cm²) than the control two fabrics (<38×10⁻⁹ cm²), both under dry and wet conditions (p<0.05); and the permeability increased under wet condition (~50×10⁻⁹ cm²) compared with that under dry condition (43×10⁻⁹ cm²) (p<0.05). This again proved the enlargement of the pores benefited the air flow through the fabric, thereby a higher breathability.

Discussion. Breathable fabrics are widely used in protective clothing as well as many other applications such as wound dressings, food packaging, roofing and filtration/separation, owing to their ability in protecting from liquid penetration, yet allowing the transmission of moisture vapor. While a resting body produces about 30 g/m²/h insensible perspiration, a person in active sports may produce as much as 1000 g/m²/h of sweat. In order to maximize the barrier protection and thermal comfort, it is therefore desirable to have smart or intelligent breathable fabrics, the water vapor permeability of which can change depending on the wearer's physiological and environmental conditions.

It was demonstrated that environmental-responsive permeability of a fabric can be achieved by creating moisture sensitive pores on the fabric, where the inner wall of the pores was coated with more crosslinked (HC) PAAm hydrogel, and the outer windows of the pore were coated with less crosslinked (LC) hydrogels. The basis of this idea was to closely mimic the mechanism of the opening and closure of the leaf stomata in nature. In these artificial stomata on a knitted nylon fabric, the outer layers of LC hydrogels were functioning as the drive of the "guard cells", which swelled largely under higher humidity (wet condition). Due to the connection with the inner less swellable HC hydrogel, the dimension change of the "guard cells" occurred asymmetrically during the swelling, i.e. the outer LC part would swell more than the interconnected restricting HC part, which led to the bending of the "guard cells" toward the outer side. Because the knitted fabric substrate is very stretchable, the outwards bending of the two "cells" bowed apart from each other, leading to the middle slit in the hydrogel (and the fabric) enlarged, therefore the pore of the artificial stomata opened. The openness of the pores under wet condition enhanced the vapor permeability to 477 g/m²/h at 35° C., which was 56% higher than the unmodified fabric at the same condition, and 100% higher than that of reported Nafion™ (perfluorosulfonic acid ionomer) film shirt having semilunar patterns (237 g/m²/h), respectively. Conversely, when humidity decreased (dry condition), the evaporation of the water turned the swelling hydrogels to their original dimensions, therefore no bending occurred and the pores closed again, without affecting the original permeability level.

The opening and closure of the artificial stomata on the fabric can be very beneficial to meet the wearer's physiological demand in different conditions. For instance, when the wearer is resting under a cold and dry condition, the artificial stomata keeps a closed status so as to retain heat and maximize barrier protection; on the other hand, when the wearer sweats profusely as a result of either physical activity or exposure to hot and humid environment, the pores of the designed fabrics are enlarged so as to increase moisture transmission for improved thermal comfort.

It is expected that concept of artificial stomata can be further improved by reducing the dimension of each artificial stomata and scaling up the coating process of patterned hydrogels on the fabric or membrane surface. If the dimension of the moisture responsive pores are reduced to microscales, the fabric or membrane would have greater barrier protection for heat retention or water repellency when the pores are closed. To commercialize the proposed technique, it is also necessary to automate or scale up the process, which may be achieved by screen printing or 3D printing.

In summary, smart moisture responsive pores were created on a commercial nylon fabric to mimic the leaf stomata, where the inner wall of the pores was coated with more cross-linked (HC) PAAm hydrogel, and the outer windows of the pore were coated with less cross-linked (LC) hydrogels. Because of the different swelling behaviors of the hydrogels, the pores of the artificial leaf stomata can open under wet condition and close under normal/dry condition. The open and close behaviors of the pores have been confirmed by the images and optical microscopy. The microstructure of hydrogels was observed under SEM. Because of the opening of the pores under wet condition, both water vapor permeability and air permeability have greatly increased for the designed fabric compared with the control fabric. The smart breathable fabric can be directly used for functional clothing to meet the wearer's different physiological demands. Besides, it can also be applied in other areas, such as would dressings, controlled nutrition/drug release, and other relevant industrial products.

Methods. Preparation of PAAm hydrogel. The polyacrylamide hydrogels were synthesized using the following protocol. 12 wt % of acrylamide monomer (AAm; Sigma-Aldrich, A8887) was dissolved in deionized (DI) water. The solution was subsequently mixed with a photoinitiator, Darocur® 1173 (BASF) at 0.2 wt % of the solution and a crosslinker, N,N'-methylene bisacrylamide (MBA; Sigma, M7279) at either 0.12 wt % or 1.2 wt % of the solution, for the less crosslinked (LC) and more crosslinked (HC) hydrogels, respectively. For some solutions, 1.2 wt % PAAm polymer (Sigma-Aldrich, $M_w$~$5\times10^6$) was also added as a comparison. The solutions were stirred overnight at room temperature, until they were homogeneous. They were then poured into a microtome embedding mold (Electron Microscopy Sciences, 15 mm wide×7 m high×4 mm deep) and cured via exposure to 365 nm UV light (UVP Blak-Ray™ B-100AP High-Intensity UV Inspection Lamps) for 10 minutes.

Preparation of three-layer sandwiched hydrogel with slit. The three-layer sandwiched hydrogel was prepared by step-by-step stacking and curing three hydrogel solutions in the same mold, with the outer layers having the less crosslinked (LC) hydrogel formula and the inner layer having the more crosslinked (HC) hydrogel formula. For the first layer, 400 μL of the LC solution having a low amount of MBA crosslinker (0.12 wt %) was injected into the mold, and was photo-polymerized via exposure to 365 nm UV light for 10 min. After the first layer has been completely cured, 400 μL of a second HC solution having the high amount of MBA (1.2 wt %) was injected into the mold on top of the first layer, and cured under the same condition. Finally, another 400 μL of the first LC solution was injected into the mold onto the second layer, and cured to form the third layer.

Coating three-layer hydrogel on pore areas of the fabric. Knitted nylon fabrics were supplied by Nanjing Yuyuan Textile Co Ltd (100% Nylon, NNP 32003). The fabrics were washed, immersed into 5 wt % benzophenone (BP, Alfa Aesar, A10739)/ethanol solution for pre-activation. For hydrogel coating, the BP pre-treated fabric was covered by a tape mask with patterned pore structure grooves (FIG. 3A). The pore area has three windows, with the inner and two outer windows having widths of 2 mm and 2.5 mm, respectively. The height of the pore is 9 mm. The horizontal and vertical distances between each pore area are 6 mm and 4 mm, respectively. A water-soluble glue viscous solution (Elmer's School Glue) was pasted into the grooves. After the glue has solidified and the tape mask has been peeled off, the stomata pore template with three windows was formed on the fabric. The different hydrogel formulas were then injected and cured into the template windows in orders, i.e., the inner middle window filled with HC solution and cured first, followed by LC solution curing in the two outer windows. A slit was then cut in the middle of the HC hydrogel. Finally, the fabric was immersed into a water bath to wash away the glue template, and air dried at room temperature.

Characterization. Morphology analysis: Scanning electron microscopy (SEM, Tescan Mira3 FESEM) was used to study the microstructure of the different cross-linked PAAm hydrogels and the nylon fabrics before and after hydrogel coating in the pore areas. The samples were frozen-dried and coated with a thin layer of gold palladium before observation.

Water response (swelling) of single hydrogel: Pieces of PAAm hydrogels (4 mm wide×7 mm high×1 mm thick) having the different amounts of the MBA cross-linker was immersed into the water. They were taken out at the desired time intervals, wiped superficially with a filter paper to remove the surface water and weighed ($W_t$). The uptake ratio was defined as ($W_t$-$W_0$)/$W_0$, where $W_0$ is the initial weight before the water immersion. The results from three similar specimens were averaged for each hydrogel sample.

Water response of hydrogels with slits: The pieces of LC PAAm hydrogel, HC hydrogel and three-layer sandwiched hydrogel (4 mm wide×7 mm high×1 mm thick) with a middle slit (6 mm high) were also immersed into the water for 10 min and checked the response behavior. Each piece of the samples was cut cross-sectionally from the molded hydrogels, on which the slits were cut in the middle position.

Water response of fabric with the pore areas coated with hydrogels: The nylon fabrics with hydrogel coating in the pore areas were also immersed into the water for 10 min and checked the pore responses. Different combinations of the hydrogel formulas were investigated. Optical microscopy (Olympus BX51, Olympus Corporation) was used to observe the pore behaviors.

Evaluation of water vapor transmission rate (WVTR): The WVTR was measured with an upright cup method according to BS 7209, with a modified temperature at 35° C. Various samples were cut into circular sharps with a diameter around 90 mm, and attached firmly to the edge of the standard aluminum cups (an inner diameter of 83 mm, an outer diameter of 90 mm, inner cup thickness of 18.5 mm, and outer cup thickness of 20 mm) via an adhesive. Each cup contained ~60 g of DI water inside and a triangular support was used underneath the samples to prevent them sagging into the cup. Samples were then placed on a heater at the temperature of 35° C., and tested over 1 h to determine the water mass loss over the time as the water vapor transmission rate (FIG. 10A). All the fabric samples were placed in a standard atmosphere (65±2% relative humidity, and a temperature of 20±2° C.) for at least 24 hours prior to testing. The results were averaged from three parallel tests.

Evaluation of air permeability: Air permeability for various fabrics were tested via a gas permeability module on a Capillary Flow Porometer 7.0 (Porous Materials Inc., USA, CFP-1100-AEHXL). Samples were cut into circular sharps with a diameter of ~25 mm, placed gently in the chamber, and fixed by the seal O-ring (an inner diameter 18.3 mm and an outer diameter 25 mm) and the adapter plates (FIG. 11). During the test, the air pressure will increase and the flow through and pressure drop across the sample will be measured. From the affiliated software, an average Darcy's Permeability Constant will be obtained for each sample according to sample thickness, diameter, air flow and the pressure. All the samples were placed in a standard atmosphere (65±2% relative humidity, and a temperature of 20±2° C.) for at least 24 hours prior to testing. The results were averaged from three parallel tests.

Data analysis: The experimental data were analyzed using ANOVA. The significance level was set at $p<0.05$. Results were reported as mean±standard deviation.

EXAMPLE 2

This example provides examples of substrates of the present disclosure, characterization of same, methods of making same, and uses of same.

Figure 12:
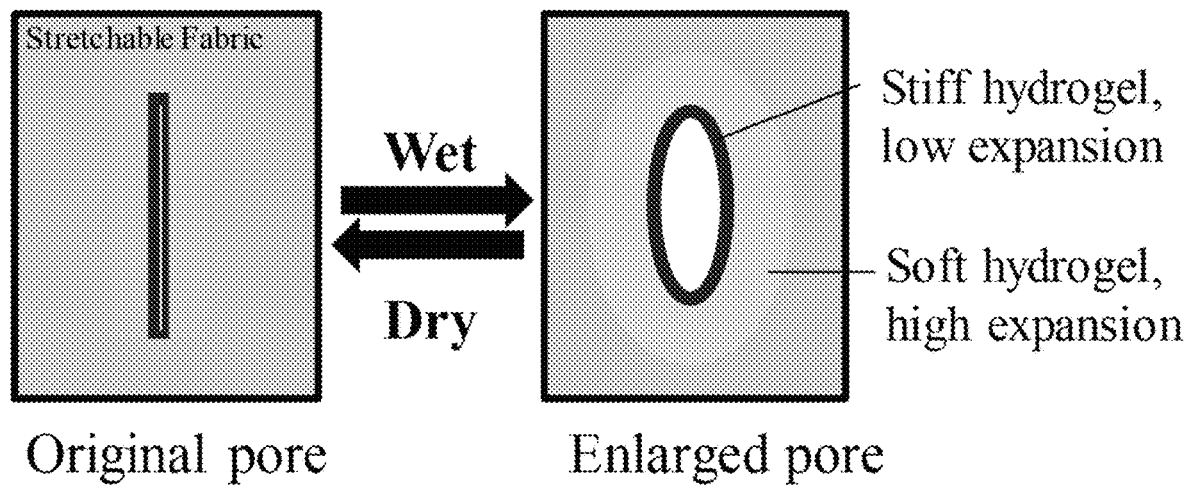
FIG. 12 shows a design of stretchable fabrics with integrated dual-layer hydrogel construct to mimic leaf stomata structure and function.
Figure 13:
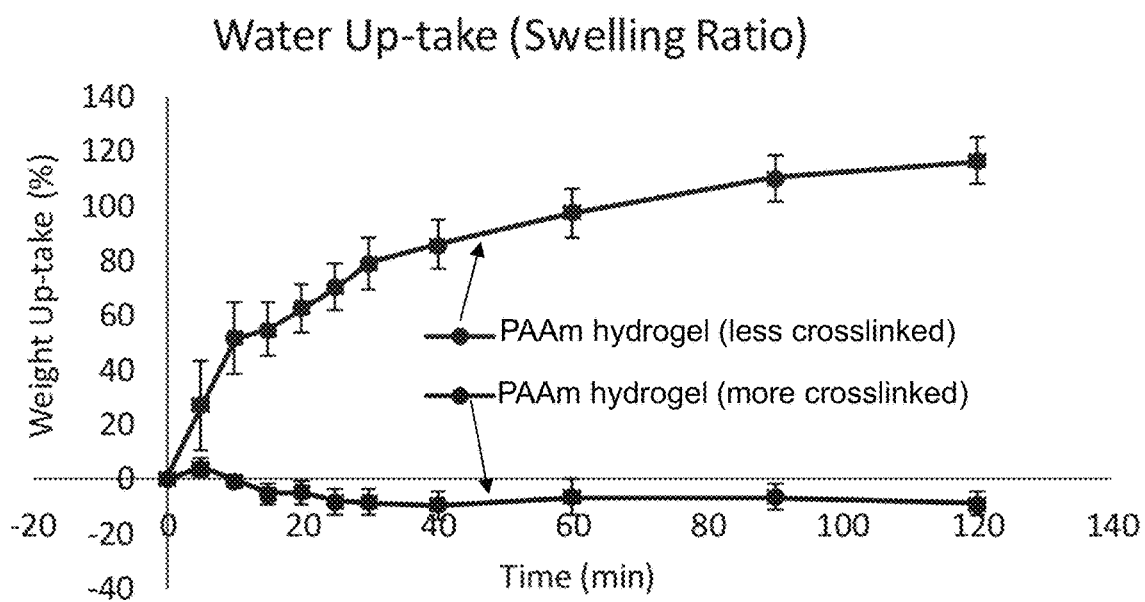
FIG. 13 shows water up-take (swelling ratios) of different cross-linked PAAm hydrogels.
Figure 14:
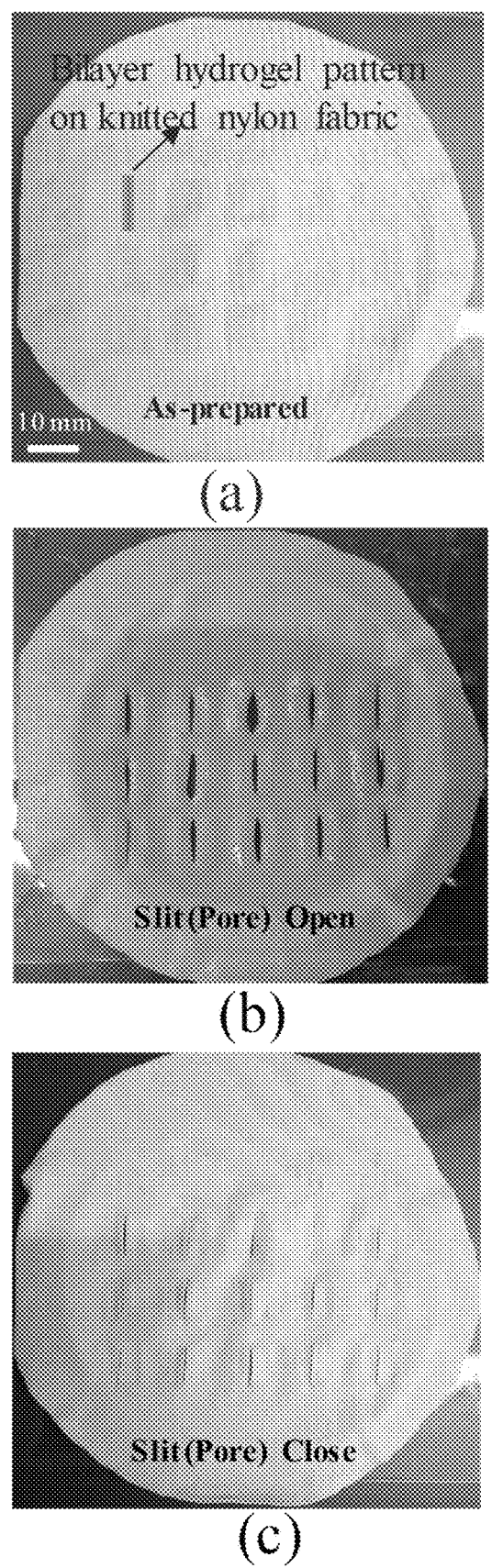
FIG. 14 shows a breathable nylon fabric with smart pores to mimic leaf stoma. (a) As-prepared knitted fabric with bilayer hydrogel and slit (pore) pattern. (b) and (c) Pore open and close responsiveness under wet and dry conditions, respectively.

A breathable fabric with smart pores to mimic the structure and function of leaf stomata for regulating the pore open and close behavior under different humidity conditions was developed. One material, PAAm hydrogel, with different stiffness was used to form a dual-layer system and integrated it into a stretchable fabric (FIG. 12). Because of the different stiffness, the two layers have different swelling/expansion abilities under humid condition, with a stiff (more crosslinked) PAAm hydrogel having a swelling ratio ~100 times of that of a soft (less crosslinked) counterpart after the full expansion, as shown in FIG. 13. When the constructs were coated on the fabric as stomata shapes (FIG. 14a), the swelling difference leads to an asymmetric bending curve towards one side under higher humidity (wet), and therefore the middle slit (pore) opens (FIG. 14b). While under the normal humidity (dry), the pore stays close status (FIG. 14c). In both conditions, the fabric maintains a flat surface without buckling, which has little effect on the overall dimension of the fabric.

The design of dual-layer hydrogel with different expansion abilities enabled the fabric pores to open and close according to the humidity conditions. The process is simple and readily scaled up. The hydrogels may be coated via digital liquid dispensers, or various industrial printing techniques, such as, for example, screen printing, 3D printing and the like. The slit can be cut by, for example, laser etching technology, with dimensions varying from micro- to millimeters, therefore the water-resistance can be adjusted. Finally, the knitted fabric is breathable, stretchable and soft, which will not influence the thermal comfort of the skin when applied as clothing.

The design of breathable fabrics with the smart pores has wide applications in developing interactive functional clothing, particularly with the advantage of self-responsiveness to humidity/water to enable spontaneous ventilation and thereby thermal comfort for the clothing. Besides humidity and water stimuli, the artificial "guard cells" can also be designed to have responses to different type of environment stimuli, e.g. temperature, pH, light, pressure, magnetic field, etc. Moreover, the polymer coating can be applied on the different surfaces, e.g. membranes, not limited to fabrics. Therefore, this technology is a platform technology for developing fabrics or membranes responsive to different stimuli for different applications.

Although the present disclosure has been described with respect to one or more particular embodiments and/or examples, it will be understood that other embodiments and/or examples of the present disclosure may be made without departing from the scope of the present disclosure.

The invention claimed is:

1. An artificial stoma structure, comprising:
a first wall extending through a depth of a substrate from a first surface of the substrate to a second surface of the substrate, the first wall comprising a first polymer gel;
a second wall extending through the depth of the substrate, the second wall comprising the first polymer gel and being disposed in opposition to the first wall;
a first region, comprising a second polymer gel, in proximity to the first wall; and
a second region, comprising the second polymer gel, in proximity to the second wall;
wherein the first polymer gel comprises a different degree of crosslinking than that of the second polymer gel,
wherein, for a first level of an external stimulus, the first polymer gel and the second polymer gel are in first states corresponding to the first wall and the second wall defining a first shape, and
wherein, for a second level of the external stimulus different than the first level of the external stimulus, the first polymer gel and the second polymer gel are in second states corresponding to the first wall and the second wall defining a second shape in which at least a portion of the first wall and the second wall are laterally spaced apart from one another along the depth of the substrate to define an aperture through the substrate between the first wall and the second wall.

2. The artificial stoma structure of claim 1, wherein in transition from the first level of the external stimulus to the second level of the external stimulus, movement of the first wall and the second wall is only in the lateral direction such that the substrate remains non-buckled.

3. The artificial stoma structure of claim 1, wherein the external stimulus comprises humidity, moisture, or temperature.

4. The artificial stoma structure of claim 3, wherein the external stimulus is moisture, such that the first level of the external stimulus corresponds to a dry state and/or ambient humidity and the second level of the external stimulus corresponds to being in contact with water.

5. The artificial stoma structure of claim 3, wherein the external stimulus is humidity, such that the first level of the external stimulus corresponds to a relative humidity of less than about 50% and the second level of the external stimulus corresponds to a relative humidity greater than 50%.

6. The artificial stoma structure of claim 1, wherein, due to the different degree of crosslinking, the first polymer gel has a lower swelling and/or expansion ratio than that of the second polymer gel, or the first polymer gel has a first swelling and/or expansion ratio higher than that of the second polymer gel.

7. The artificial stoma structure of claim 6, wherein the first polymer gel has a lower swelling ratio and/or expansion ratio than that of the second polymer gel, such that the swelling and/or expansion ratio of the second polymer gel is 2 times or more than the swelling and/or expansion ratio of the first polymer gel.

8. The artificial stoma structure of claim 1, wherein the first region extends in parallel along at least a portion of the first shape defined in part by the first wall and wherein the second region extends in parallel along at least a portion of the first shape defined in part by the second wall.

9. The artificial stoma structure of claim 1, wherein the first wall and the second wall are cooperative parts of a continuous wall comprising the first polymer gel, and wherein the first region and the second region are cooperative parts of a continuous region comprising the second polymer gel and entirely surrounding the first polymer gel.

10. The artificial stoma structure of claim 1, wherein the first polymer gel and/or the second polymer gel comprises a water-insoluble polymer hydrogel or polyacrylamide gel.

11. The artificial stoma structure of claim 1, wherein the first polymer gel and/or the second polymer gel has a thickness of 0.001 to 2000 microns.

12. The artificial stoma structure of claim 1, wherein in the second shape, the first wall and the second wall are laterally spaced apart from one another by 10 microns to 10 cm over at least a portion of the aperture.

13. The artificial stoma structure of claim 1, wherein the aperture corresponds to an aspect ratio of at least 1:2.

14. The artificial stoma structure of claim 1, wherein, for the first level of the external stimulus, the first shape defined by the first wall and the second wall is a slit, with the first wall and the second wall being at least substantially adjacent to one another.

15. The artificial stoma structure of claim 1, wherein, for the first level of the external stimulus, the first shape defined by the first wall and the second wall is a substantially rectangular gap through the substrate between the first wall and the second wall having a smaller lateral distance between the first wall and the second wall than that of the aperture corresponding to the second level of the external stimulus.

16. The artificial stoma structure of claim 15, wherein a lateral distance between the first wall and the second wall at at least a portion of the aperture corresponding to the second level of the external stimulus is 0.1 to 100 times larger than that of the rectangular gap corresponding to the first level of the external stimulus.

17. The artificial stoma structure of claim 1, wherein the substrate comprises at least one of a fabric layer or a film layer.

18. The artificial stoma structure of claim 17, wherein the substrate comprises a fabric layer, the fabric layer comprising a woven fabric having a weave structure, a knitted fabric having a knitted structure, or a non-woven fabric.

19. The artificial stoma structure of claim 18, wherein the fabric layer comprises natural fibers, synthetic fibers, semi-synthetic fibers, or a combination thereof.

20. An artificial stomata structure, wherein a substrate comprises a plurality of the artificial stoma structures of claim 1, such that for the second level of the external stimulus, a plurality of corresponding apertures are formed through the substrate.

21. The artificial stoma structure of claim 20, wherein the area of the plurality of corresponding apertures defined by the plurality of artificial stoma structures is 20 to 50% of a total area of the substrate.

22. An article of manufacture comprising the artificial stoma structure of claim 20.

23. The article of manufacture of claim 22, wherein the article of manufacture is a wearable article or an outdoor article.

24. The article of manufacture of claim 23, wherein the wearable article comprises rainwear, outerwear, outdoor clothing, sportswear, skiwear, hiking wear, under garments, socks, t-shirts, hats, gloves, mittens, jackets, coats, or ponchos.

25. The article of manufacture of claim 23, wherein the outdoor article comprises a tent, a tarp, or a sleeping bag.

* * * * *